United States Patent
Brunel et al.

(10) Patent No.: US 11,245,552 B2
(45) Date of Patent: Feb. 8, 2022

(54) SOUNDING REFERENCE SIGNAL SWITCHING

(71) Applicant: Skyworks Solutions, Inc., Irvine, CA (US)

(72) Inventors: Dominique Michel Yves Brunel, Antibes (FR); Laurent Noel, Laval (CA)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 16/828,135

(22) Filed: Mar. 24, 2020

(65) Prior Publication Data

US 2020/0366532 A1 Nov. 19, 2020

Related U.S. Application Data

(60) Provisional application No. 62/826,750, filed on Mar. 29, 2019.

(51) Int. Cl.
| | |
|---|---|
| *H04L 25/02* | (2006.01) |
| *H04L 5/00* | (2006.01) |
| *H04L 27/26* | (2006.01) |
| *H04W 8/24* | (2009.01) |
| *H04B 7/0413* | (2017.01) |

(52) U.S. Cl.
CPC ........ *H04L 25/0226* (2013.01); *H04L 5/0051* (2013.01); *H04L 5/0094* (2013.01); *H04L 27/2605* (2013.01); *H04L 27/2613* (2013.01); *H04W 8/24* (2013.01); *H04B 7/0413* (2013.01)

(58) Field of Classification Search
None
See application file for complete search history.

(56) References Cited

U.S. PATENT DOCUMENTS

| | | |
|---|---|---|
| 8,274,931 B2 | 9/2012 | Pajukoski et al. |
| 8,295,153 B2 | 10/2012 | Nentwig et al. |
| 8,441,999 B2 | 5/2013 | Xiao et al. |
| 9,060,363 B2 | 6/2015 | Xiao et al. |
| 9,154,277 B2 | 10/2015 | Ekpenyong et al. |
| 9,628,140 B2 | 4/2017 | Xie et al. |
| 9,780,901 B2 | 10/2017 | Cheng et al. |
| 9,848,424 B2 | 12/2017 | Wang et al. |
| 10,021,573 B2 | 7/2018 | Chou et al. |
| 10,091,766 B2 | 10/2018 | Chen et al. |
| 10,225,836 B2 | 3/2019 | Wang et al. |
| 10,263,758 B2 | 4/2019 | Lee et al. |
| 10,425,973 B2 | 9/2019 | Patel et al. |
| 10,470,205 B2 | 11/2019 | Parkvall et al. |
| 10,700,908 B2 | 6/2020 | Baldemair et al. |

(Continued)

*Primary Examiner* — Otis L Thompson, Jr.
(74) *Attorney, Agent, or Firm* — Knobbe, Martens, Olson & Bear, LLP

(57) ABSTRACT

Apparatus and methods for sounding reference signal (SRS) switching are provided. In certain embodiments, transmit path resources of UE are used to reduce or eliminate the impairment of SRS upon transport capacity. Furthermore, the transmit path resources can be used for other purposes, and thus SRS switching time can be reduced by re-using transmit path resources that may be included for other purposes. The teachings herein can be used to achieve SRS switching of 0 µs, thereby eliminating the impact of switching timing constraints for SRS symbols on transport capacity.

20 Claims, 20 Drawing Sheets

(56) References Cited

U.S. PATENT DOCUMENTS

| | | |
|---|---|---|
| 10,826,661 B2 | 11/2020 | Miao et al. |
| 2012/0113967 A1 | 5/2012 | Smith et al. |
| 2012/0201149 A1 | 8/2012 | Skärby et al. |
| 2013/0182674 A1 | 7/2013 | Lunttila et al. |
| 2014/0241242 A1* | 8/2014 | Josiam .................. H04L 5/0048 370/328 |
| 2016/0142190 A1 | 5/2016 | Lunttila et al. |
| 2017/0055256 A1 | 2/2017 | Zhang |
| 2017/0180094 A1* | 6/2017 | Wu ........................ H04K 3/41 |
| 2018/0103433 A1 | 4/2018 | Li et al. |
| 2019/0044678 A1* | 2/2019 | Liu ....................... H04L 5/0098 |
| 2019/0109689 A1* | 4/2019 | Huang .................... H04L 5/14 |
| 2019/0200353 A1 | 6/2019 | Wang et al. |
| 2019/0238305 A1 | 8/2019 | Lee et al. |
| 2019/0253214 A1* | 8/2019 | Liu ..................... H04L 25/0224 |
| 2019/0288808 A1 | 9/2019 | Baldemair et al. |
| 2019/0349098 A1 | 11/2019 | Jiang et al. |
| 2019/0349237 A1 | 11/2019 | Baldemair et al. |
| 2020/0177339 A1 | 6/2020 | Hessler et al. |
| 2020/0213066 A1* | 7/2020 | Ma ........................ H04W 72/04 |
| 2020/0274671 A1* | 8/2020 | Behravan ............ H04L 27/2666 |
| 2020/0275431 A1 | 8/2020 | Bae et al. |
| 2020/0288433 A1 | 9/2020 | Yu et al. |
| 2020/0296656 A1 | 9/2020 | Amuru et al. |
| 2020/0343981 A1 | 10/2020 | Garcia et al. |
| 2021/0083825 A1* | 3/2021 | Choi ......................... H04L 1/06 |
| 2021/0105724 A1* | 4/2021 | Huang ................. H04B 7/0689 |
| 2021/0105810 A1* | 4/2021 | Shen ................. H04W 72/0453 |
| 2021/0107542 A1* | 4/2021 | Cross .................. B61L 15/0027 |
| 2021/0109145 A1* | 4/2021 | Haustein ............ G01R 29/0871 |

\* cited by examiner

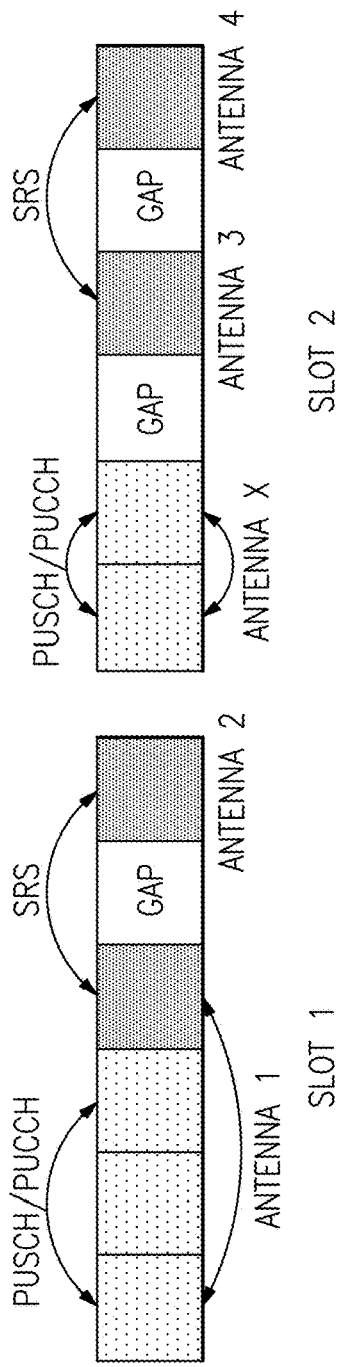

| NUMEROLOGY [μ] | 0 | 1 | 2 | 3 | 4 |
|---|---|---|---|---|---|
| SUBCARRIER SPACING [kHz] | 15 | 30 | 60 | 120 | 240 |
| NUMBER OF SLOTS / SUBFRAME | 1 | 2 | 4 | 8 | 16 |
| OFDM SYMBOL DURATION (1:13)[μs] | 66.67 | 33.33 | 16.67 | 8.33 | 4.17 |
| CYCLIC PREFIX DURATION (1:13)[μs] | 4.69 | 2.34 | 1.17 | 0.57 | 0.29 |
| OFDM SYMBOL INCLUDING CP(1:13)[μs] | 71.35 | 35.68 | 17.84 | 8.92 | 4.46 |
| MINIMUM SCHEDULING INTERVAL[μs] | 1000 | 500 | 250 | 125 | 62.5 |
| SCHEDULING INTERVAL FOR MINI SLOT LENGTH 2 OS[μs] | 142 | 71 | 36 | 18 | 9 |

| | SCS (kHz) | SYMBOL + CP LENGTH (μs) | TRANSIENT TIME (μs) | %SYMBOL LOST (%) | TRANSIENT TIME (μs) | %SYMBOL LOST (%) | TRANSIENT TIME (μs) | %SYMBOL LOST (%) |
|---|---|---|---|---|---|---|---|---|
| FR1 | 15 | 71.35 | 10 | 14 | 5 | 7 | 1 | 14 |
| FR1 | 30 | 35.68 | 10 | 28 | 5 | 14 | 1 | 3 |
| FR1 | 60 | 17.84 | 10 | 56 | 5 | 28 | 1 | 6 |
| FR1 | 60 | 17.84 | 5 | 30 | 3 | 17 | 1 | 6 |
| FR2 | 120 | 8.92 | 5 | 60 | 3 | 34 | 1 | 11 |

FIG.10C

SOUNDING REFERENCE SIGNAL SWITCHING

CROSS-REFERENCE TO RELATED APPLICATIONS

This application claims the benefit of priority under 35 U.S.C. § 119 of U.S. Provisional Patent Application No. 62/826,750, filed Mar. 29, 2019 and titled "SOUNDING REFERENCE SIGNAL SWITCHING," which is herein incorporated by reference in its entirety.

BACKGROUND

Field

Embodiments of the invention relate to electronic systems, and in particular, to radio frequency electronics.

Description of Related Technology

Radio frequency (RF) communication systems can be used for transmitting and/or receiving signals of a wide range of frequencies. For example, an RF communication system can be used to wirelessly communicate RF signals in a frequency range of about 30 kHz to 300 GHz, such as in the range of about 410 MHz to about 7.125 GHz for fifth generation (5G) communications using Frequency Range 1 (FR1).

Examples of RF communication systems include, but are not limited to, mobile phones, tablets, base stations, network access points, customer-premises equipment (CPE), laptops, and wearable electronics.

SUMMARY

In certain embodiments, the present disclosure relates to a mobile device. The mobile device includes a first transmit chain including a first power amplifier, a second transmit chain including a second power amplifier, and a baseband system configured to generate a first sequence of symbols for transmission by way of the first transmit chain and a second sequence of symbols for transmission by way of the second transmit chain. The baseband system is further configured to stagger the first sequence of symbols and the second sequence of symbols, and to include one or more sounding reference signal symbols in the second sequence of symbols.

In various embodiments, the baseband system is further configured to stager symbol transmissions of the first sequence of symbols relative to the second sequence of symbols with substantially no delay between symbol transmissions.

In several embodiments, the first transmit chain is a first uplink multi-input multiple-output chain, and the second transmit chain is a second uplink multiple-input multiple-output chain.

In some embodiments, the baseband system is further configured to provide the second sequence of symbols for transmission when an uplink multi-input multiple-output mode is disabled.

In a number of embodiments, the mobile device further includes a first antenna and a second antenna, and the baseband system is further configured to transmit at least a portion of the first sequence of symbols using the first antenna and to transmit at least a portion of the second sequence of symbols using the second antenna.

In several embodiments, the baseband system is further configured to include one or more sounding reference signal symbols in the first sequence of symbols.

In some embodiments, the baseband system is further configured to include no sounding reference signal symbols in the first sequence of symbols.

In various embodiments, the baseband system is further configured to include at least one Physical Uplink Shared Channel (PUSCH) symbol in the first sequence of symbols.

In a number of embodiments, the baseband system is further configured to include at least one Physical Uplink Control Channel (PUCCH) symbol in the first sequence of symbols.

In several embodiments, the baseband system is further configured to include no blank symbols in either of the first sequence of symbols or the second sequence of symbols.

In some embodiments, the baseband system is further configured to encode the first sequence of symbols and the second sequence of symbols in accordance with a Fifth Generation (5G) communication standard.

In several embodiments, the baseband system is further configured to alternate symbol transmissions of the first sequence of symbols and the second sequence of symbols.

In various embodiments, the mobile device further includes a first antenna and two or more antennas in addition to the first antenna, the baseband system further configured to transmit the first sequence of symbols using the first antenna and to transmit the second sequence of symbols using the two or more antennas.

In several embodiments, the mobile device further includes a first group of two or more antennas and a second group of two or more antennas, the baseband system further configured to transmit the first sequence of symbols using the first group and to transmit the second sequence of symbols using the second group.

In some embodiments, the baseband system is further configured to receive a capability inquiry from a base station, and to transmit capability information to the base station in response to the capability inquiry. According to a number of embodiments, the baseband system is further configured to receive transmit configuration information from the base station, and to configure the first transmit chain and the second transmit chain to operate with a switching time indicated by the transmit configuration information. In accordance with various embodiments, the transmit configuration information indicates transmissions duplexed using time-division duplexing. According to several embodiments, the transmit configuration information indicates transmissions duplexed using frequency-division duplexing. In accordance with a number of embodiments, the transmit configuration information indicates a switching time of 0 microsecond. According to various embodiments, the capability information indicates switching capability for each of a plurality of subcarrier spacings. In accordance with several embodiments, the capability information indicates switching capability for each of a plurality of frequency bands. According to a number of embodiments, the capability information indicates whether or not the user equipment complies with a switching time threshold.

In certain embodiments, the present disclosure relates to a method of sounding reference signal switching in a mobile device. The method includes transmitting a first sequence of symbols using a first transmit path through a first power amplifier, and transmitting a second sequence of symbols using a second transmit path through a second power amplifier, including staggering symbol transmissions of the second sequence of symbols with respect to the first sequence of symbols, and transmitting one or more sounding reference signal symbols in the second sequence of symbols.

In some embodiments, the method further includes staggering symbol transmissions of the second sequence of symbols with respect to the first sequence of symbols with substantially no delay between symbol transmissions.

In several embodiments, the first transmit path is a first uplink multi-input multiple-output path, and the second transmit path is a second uplink multiple-input multiple-output path.

In various embodiments, the method further includes transmitting the second sequence of symbols when an uplink multiple-input multiple-output mode is disabled.

In a number of embodiments, the method further includes transmitting at least a first portion of the first sequence of the symbols on a first antenna, and transmitting at least a first portion of the second sequence of symbols on a second antenna.

In some embodiments, the method further includes transmitting one or more sounding reference signal symbols in the first sequence of symbols.

In several embodiments, the method further includes transmitting no sounding reference signal symbols in the first sequence of symbols.

In a number of embodiments, the method further includes transmitting at least one Physical Uplink Shared Channel (PUSCH) symbol in the first sequence of symbols.

In various embodiments, the method further includes transmitting at least one Physical Uplink Control Channel (PUCCH) symbol in the first sequence of symbols.

In some embodiments, the method further includes transmitting no blank symbols in either of the first sequence of symbols or the second sequence of symbols.

In several embodiments, the method further includes transmitting the first sequence of symbols and the second sequence of symbols over a Fifth Generation (5G) network.

In a number of embodiments, the method further includes alternating symbol transmissions of the first sequence of symbols and the second sequence of symbols.

In several embodiments, the method further includes transmitting the first sequence of symbols using a first antenna, and transmitting the second sequence of symbols using two or more antennas each different from the first antenna.

In some embodiments, the method further includes transmitting the first sequence of symbols using a first group of two or more antennas, and transmitting the second sequence of symbols using a second group of two or more antennas, each antenna of the second group different from each antenna in the first group.

In various embodiments, the method further includes receiving a capability inquiry from a base station, and transmitting capability information to the base station in response to the capability inquiry. According to some embodiments, the method further includes receiving transmit configuration information from the base station, and configuring a front end system of the mobile device to operate with a switching time indicated by the transmit configuration information, the front end system including the first transmit path and the second transmit path. In accordance with a number of embodiments, the transmit configuration information indicates transmissions duplexed using time-division duplexing. According to several embodiments, the transmit configuration information indicates transmissions duplexed using frequency-division duplexing. In accordance with some embodiments, the transmit configuration information indicates a switching time of 0 microsecond. According to a number of embodiments, the capability information indicates switching capability for each of a plurality of subcarrier spacings. In accordance with several embodiments, the capability information indicates switching capability for each of a plurality of frequency bands. According to some embodiments, the capability information indicates whether or not the user equipment complies with a switching time threshold.

In certain embodiments, the present disclosure relates to a front end system. The front end system includes a plurality of terminals including a first transmit terminal, a second transmit terminal, a first antenna terminal, and a second antenna terminal. The front end system further includes a first power amplifier configured to amplify a first radio frequency transmit signal received from the first transmit terminal and to provide a first amplified radio frequency transmit signal to the first antenna terminal, the first radio frequency transmit signal carrying a first sequence of symbols. The front end system further includes a second power amplifier configured to amplify a second radio frequency transmit signal received from the second transmit terminal and to provide a second amplified radio frequency transmit signal to the second antenna terminal, the second radio frequency signal carrying a second sequence of symbols that is staggered with respect to the first sequence of symbols and that includes one or more sounding reference signal symbols.

BRIEF DESCRIPTION OF THE DRAWINGS

FIG. 6A is a diagram depicting two examples of symbol blanking for time slots including sounding reference signal (SRS) symbols.

FIG. 6B is a table depicting one example of symbol duration versus subcarrier spacing (SCS).

FIG. 10C is a table of one example of an impact of transients on an uplink physical layer.

DETAILED DESCRIPTION OF EMBODIMENTS

Figure 1:
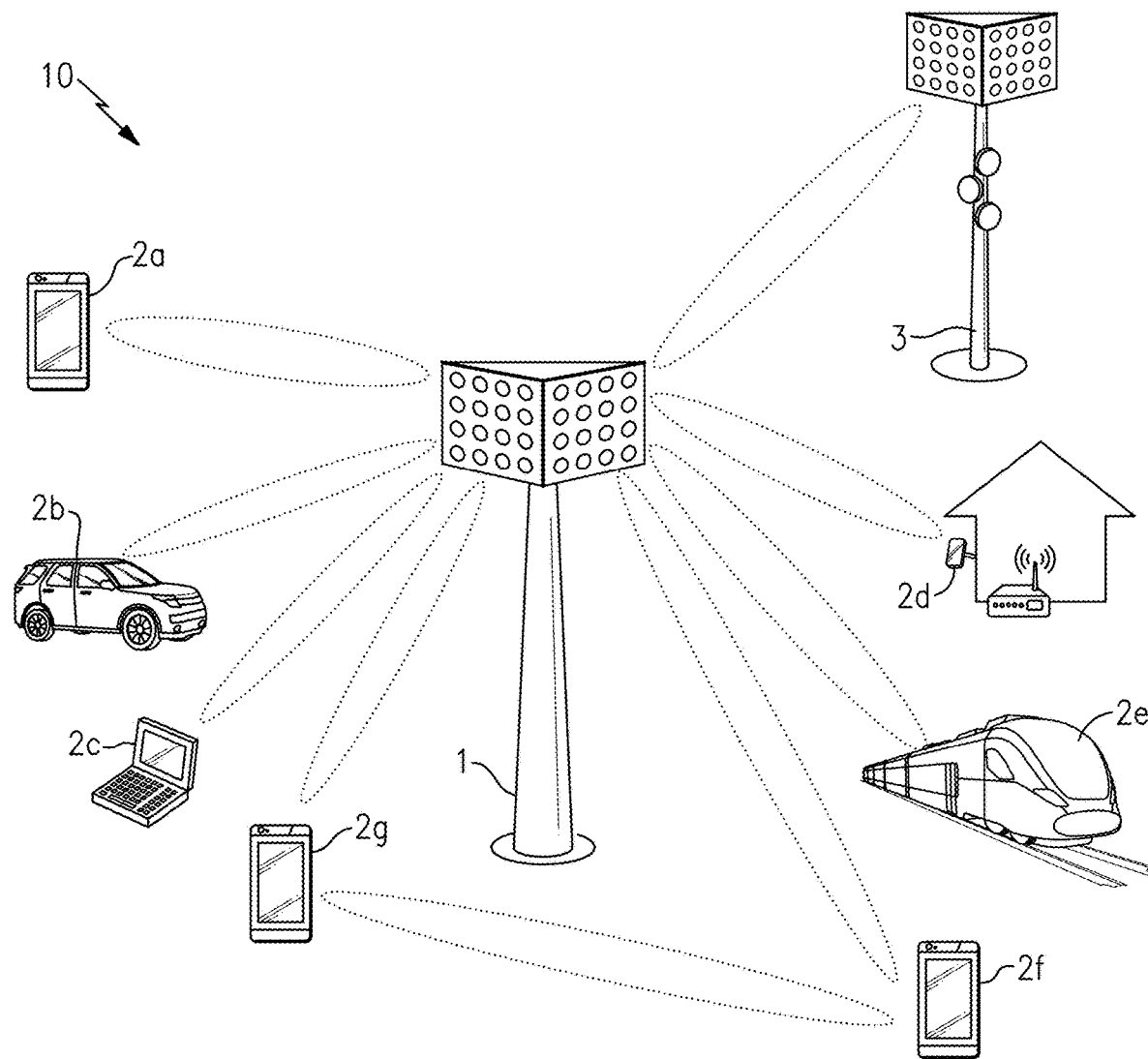
FIG. 1 is a schematic diagram of one example of a communication network.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The International Telecommunication Union (ITU) is a specialized agency of the United Nations (UN) responsible for global issues concerning information and communication technologies, including the shared global use of radio spectrum.

The 3rd Generation Partnership Project (3GPP) is a collaboration between groups of telecommunications standard bodies across the world, such as the Association of Radio Industries and Businesses (ARIB), the Telecommunications Technology Committee (TTC), the China Communications Standards Association (CCSA), the Alliance for Telecommunications Industry Solutions (ATIS), the Telecommunications Technology Association (TTA), the European Telecommunications Standards Institute (ETSI), and the Telecommunications Standards Development Society, India (TSDSI).

Working within the scope of the ITU, 3GPP develops and maintains technical specifications for a variety of mobile communication technologies, including, for example, second generation (2G) technology (for instance, Global System for Mobile Communications (GSM) and Enhanced Data Rates for GSM Evolution (EDGE)), third generation (3G) technology (for instance, Universal Mobile Telecommunications System (UMTS) and High Speed Packet Access (HSPA)), and fourth generation (4G) technology (for instance, Long Term Evolution (LTE) and LTE-Advanced).

The technical specifications controlled by 3GPP can be expanded and revised by specification releases, which can span multiple years and specify a breadth of new features and evolutions.

In one example, 3GPP introduced carrier aggregation (CA) for LTE in Release 10. Although initially introduced with two downlink carriers, 3GPP expanded carrier aggregation in Release 14 to include up to five downlink carriers and up to three uplink carriers. Other examples of new features and evolutions provided by 3GPP releases include, but are not limited to, License Assisted Access (LAA), enhanced LAA (eLAA), Narrowband Internet of things (NB-IOT), Vehicle-to-Everything (V2X), and High Power User Equipment (HPUE).

3GPP introduced Phase 1 of fifth generation (5G) technology in Release 15, and plans to introduce Phase 2 of 5G technology in Release 16 (targeted for 2020). Subsequent 3GPP releases will further evolve and expand 5G technology. 5G technology is also referred to herein as 5G New Radio (NR).

5G NR supports or plans to support a variety of features, such as communications over millimeter wave spectrum, beamforming capability, high spectral efficiency waveforms, low latency communications, multiple radio numerology, and/or non-orthogonal multiple access (NOMA). Although such RF functionalities offer flexibility to networks and enhance user data rates, supporting such features can pose a number of technical challenges.

The teachings herein are applicable to a wide variety of communication systems, including, but not limited to, communication systems using advanced cellular technologies, such as LTE-Advanced, LTE-Advanced Pro, and/or 5G NR.

FIG. 1 is a schematic diagram of one example of a communication network 10. The communication network 10 includes a macro cell base station 1, a small cell base station 3, and various examples of user equipment (UE), including a first mobile device 2a, a wireless-connected car 2b, a laptop 2c, a stationary wireless device 2d, a wireless-connected train 2e, a second mobile device 2f, and a third mobile device 2g.

Although specific examples of base stations and user equipment are illustrated in FIG. 1, a communication network can include base stations and user equipment of a wide variety of types and/or numbers.

For instance, in the example shown, the communication network 10 includes the macro cell base station 1 and the small cell base station 3. The small cell base station 3 can operate with relatively lower power, shorter range, and/or with fewer concurrent users relative to the macro cell base station 1. The small cell base station 3 can also be referred to as a femtocell, a picocell, or a microcell. Although the communication network 10 is illustrated as including two base stations, the communication network 10 can be implemented to include more or fewer base stations and/or base stations of other types.

Although various examples of user equipment are shown, the teachings herein are applicable to a wide variety of user equipment, including, but not limited to, mobile phones, tablets, laptops, IoT devices, wearable electronics, customer premises equipment (CPE), wireless-connected vehicles, wireless relays, and/or a wide variety of other communication devices. Furthermore, user equipment includes not only currently available communication devices that operate in a cellular network, but also subsequently developed communication devices that will be readily implementable with the inventive systems, processes, methods, and devices as described and claimed herein.

The illustrated communication network 10 of FIG. 1 supports communications using a variety of cellular technologies, including, for example, 4G LTE and 5G NR. In certain implementations, the communication network 10 is further adapted to provide a wireless local area network (WLAN), such as WiFi. Although various examples of communication technologies have been provided, the communication network 10 can be adapted to support a wide variety of communication technologies.

Various communication links of the communication network 10 have been depicted in FIG. 1. The communication links can be duplexed in a wide variety of ways, including, for example, using frequency-division duplexing (FDD) and/or time-division duplexing (TDD). FDD is a type of radio frequency communications that uses different frequencies for transmitting and receiving signals. FDD can provide a number of advantages, such as high data rates and low latency. In contrast, TDD is a type of radio frequency communications that uses about the same frequency for transmitting and receiving signals, and in which transmit and receive communications are switched in time. TDD can provide a number of advantages, such as efficient use of spectrum and variable allocation of throughput between transmit and receive directions.

In certain implementations, user equipment can communicate with a base station using one or more of 4G LTE, 5G NR, and WiFi technologies. In certain implementations, enhanced license assisted access (eLAA) is used to aggregate one or more licensed frequency carriers (for instance, licensed 4G LTE and/or 5G NR frequencies), with one or more unlicensed carriers (for instance, unlicensed WiFi frequencies).

As shown in FIG. 1, the communication links include not only communication links between UE and base stations, but also UE to UE communications and base station to base station communications. For example, the communication network 10 can be implemented to support self-fronthaul and/or self-backhaul.

The communication links can operate over a wide variety of frequencies. In certain implementations, communications are supported using 5G NR technology over one or more frequency bands that are less than 6 Gigahertz (GHz) and/or over one or more frequency bands that are greater than 6 GHz. For example, the communication links can serve Frequency Range 1 (FR1), Frequency Range 2 (FR2), or a combination thereof. In one embodiment, one or more of the mobile devices support a HPUE power class specification.

In certain implementations, a base station and/or user equipment communicates using beamforming. For example, beamforming can be used to focus signal strength to overcome path losses, such as high loss associated with communicating over high signal frequencies. In certain embodiments, user equipment, such as one or more mobile phones, communicate using beamforming on millimeter wave frequency bands in the range of 30 GHz to 300 GHz and/or upper centimeter wave frequencies in the range of 6 GHz to 30 GHz, or more particularly, 24 GHz to 30 GHz.

Different users of the communication network 10 can share available network resources, such as available frequency spectrum, in a wide variety of ways.

In one example, frequency division multiple access (FDMA) is used to divide a frequency band into multiple frequency carriers. Additionally, one or more carriers are allocated to a particular user. Examples of FDMA include, but are not limited to, single carrier FDMA (SC-FDMA) and orthogonal FDMA (OFDMA). OFDMA is a multicarrier technology that subdivides the available bandwidth into multiple mutually orthogonal narrowband subcarriers, which can be separately assigned to different users.

Other examples of shared access include, but are not limited to, time division multiple access (TDMA) in which a user is allocated particular time slots for using a frequency resource, code division multiple access (CDMA) in which a frequency resource is shared amongst different users by assigning each user a unique code, space-divisional multiple access (SDMA) in which beamforming is used to provide shared access by spatial division, and non-orthogonal multiple access (NOMA) in which the power domain is used for multiple access. For example, NOMA can be used to serve multiple users at the same frequency, time, and/or code, but with different power levels.

Enhanced mobile broadband (eMBB) refers to technology for growing system capacity of LTE networks. For example, eMBB can refer to communications with a peak data rate of at least 10 Gbps and a minimum of 100 Mbps for each user. Ultra-reliable low latency communications (uRLLC) refers to technology for communication with very low latency, for instance, less than 2 milliseconds. uRLLC can be used for mission-critical communications such as for autonomous driving and/or remote surgery applications. Massive machine-type communications (mMTC) refers to low cost and low data rate communications associated with wireless connections to everyday objects, such as those associated with Internet of Things (IoT) applications.

The communication network 10 of FIG. 1 can be used to support a wide variety of advanced communication features, including, but not limited to, eMBB, uRLLC, and/or mMTC.

Figure 2A:
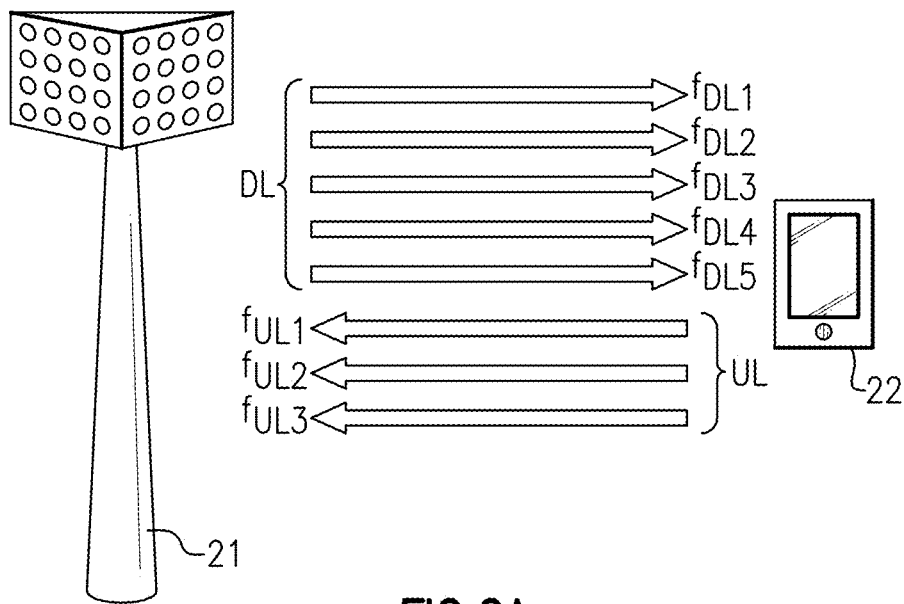
FIG. 2A is a schematic diagram of one example of a communication link using carrier aggregation.

FIG. 2A is a schematic diagram of one example of a communication link using carrier aggregation. Carrier aggregation can be used to widen bandwidth of the communication link by supporting communications over multiple frequency carriers, thereby increasing user data rates and enhancing network capacity by utilizing fragmented spectrum allocations.

In the illustrated example, the communication link is provided between a base station 21 and a mobile device 22. As shown in FIG. 2A, the communications link includes a downlink channel used for RF communications from the base station 21 to the mobile device 22, and an uplink channel used for RF communications from the mobile device 22 to the base station 21.

Although FIG. 2A illustrates carrier aggregation in the context of FDD communications, carrier aggregation can also be used for TDD communications.

In certain implementations, a communication link can provide asymmetrical data rates for a downlink channel and an uplink channel. For example, a communication link can be used to support a relatively high downlink data rate to enable high speed streaming of multimedia content to a mobile device, while providing a relatively slower data rate for uploading data from the mobile device to the cloud.

In the illustrated example, the base station 21 and the mobile device 22 communicate via carrier aggregation, which can be used to selectively increase bandwidth of the communication link. Carrier aggregation includes contiguous aggregation, in which contiguous carriers within the same operating frequency band are aggregated. Carrier aggregation can also be non-contiguous, and can include carriers separated in frequency within a common band or in different bands.

In the example shown in FIG. 2A, the uplink channel includes three aggregated component carriers $f_{UL1}$, $f_{UL2}$, and $f_{UL3}$. Additionally, the downlink channel includes five aggregated component carriers $f_{DL1}$, $f_{DL2}$, $f_{DL3}$, $f_{DL4}$, and $f_{DL5}$. Although one example of component carrier aggregation is shown, more or fewer carriers can be aggregated for uplink and/or downlink. Moreover, a number of aggregated carriers can be varied over time to achieve desired uplink and downlink data rates.

For example, a number of aggregated carriers for uplink and/or downlink communications with respect to a particular mobile device can change over time. For example, the number of aggregated carriers can change as the device moves through the communication network and/or as network usage changes over time.

Figure 2B:
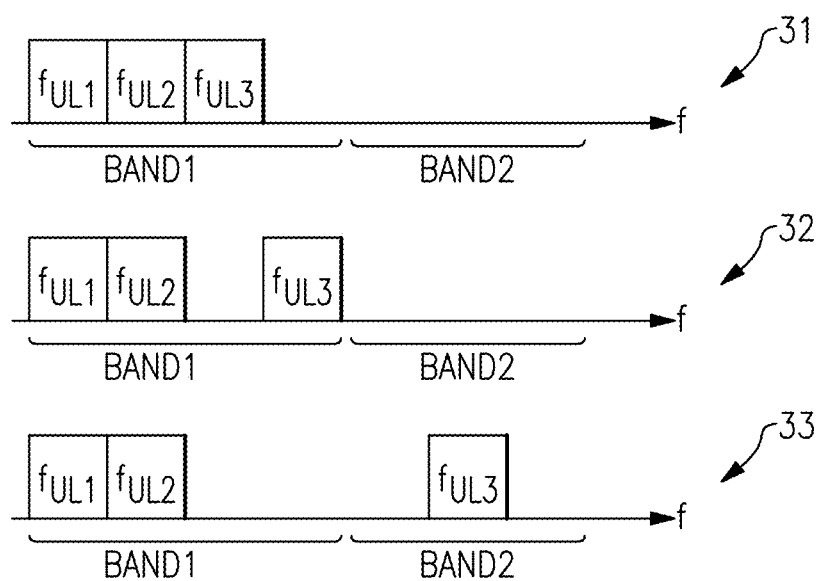
FIG. 2B illustrates various examples of uplink carrier aggregation for the communication link of FIG. 2A.

FIG. 2B illustrates various examples of uplink carrier aggregation for the communication link of FIG. 2A. FIG. 2B includes a first carrier aggregation scenario 31, a second carrier aggregation scenario 32, and a third carrier aggregation scenario 33, which schematically depict three types of carrier aggregation.

The carrier aggregation scenarios 31-33 illustrate different spectrum allocations for a first component carrier $f_{UL1}$, a second component carrier $f_{UL2}$, and a third component carrier $f_{UL3}$. Although FIG. 2B is illustrated in the context of aggregating three component carriers, carrier aggregation can be used to aggregate more or fewer carriers. Moreover, although illustrated in the context of uplink, the aggregation scenarios are also applicable to downlink.

The first carrier aggregation scenario 31 illustrates intra-band contiguous carrier aggregation, in which component carriers that are adjacent in frequency and in a common frequency band are aggregated. For example, the first carrier aggregation scenario 31 depicts aggregation of component carriers $f_{UL1}$, $f_{UL2}$, and $f_{UL3}$ that are contiguous and located within a first frequency band BAND1.

With continuing reference to FIG. 2B, the second carrier aggregation scenario 32 illustrates intra-band non-continuous carrier aggregation, in which two or more components carriers that are non-adjacent in frequency and within a common frequency band are aggregated. For example, the second carrier aggregation scenario 32 depicts aggregation of component carriers $f_{UL1}$, $f_{UL2}$, and $f_{UL3}$ that are non-contiguous, but located within a first frequency band BAND1.

The third carrier aggregation scenario 33 illustrates inter-band non-contiguous carrier aggregation, in which component carriers that are non-adjacent in frequency and in multiple frequency bands are aggregated. For example, the third carrier aggregation scenario 33 depicts aggregation of component carriers $f_{UL1}$ and $f_{UL2}$ of a first frequency band BAND1 with component carrier $f_{UL3}$ of a second frequency band BAND2.

Figure 2C:
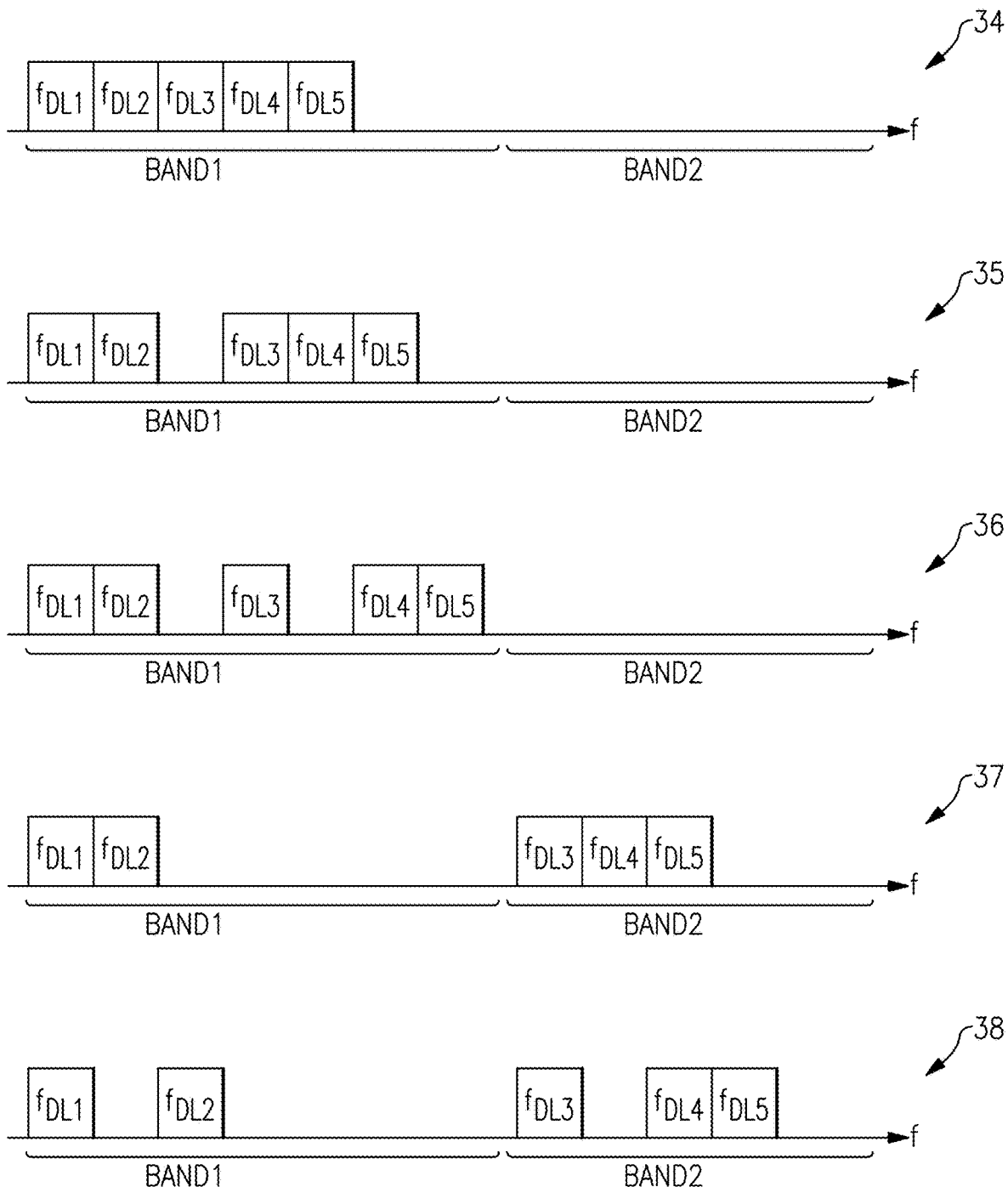
FIG. 2C illustrates various examples of downlink carrier aggregation for the communication link of FIG. 2A.

FIG. 2C illustrates various examples of downlink carrier aggregation for the communication link of FIG. 2A. The examples depict various carrier aggregation scenarios 34-38 for different spectrum allocations of a first component carrier $f_{DL1}$, a second component carrier $f_{DL2}$, a third component carrier $f_{DL3}$, a fourth component carrier $f_{DL4}$, and a fifth component carrier $f_{DL5}$. Although FIG. 2C is illustrated in the context of aggregating five component carriers, carrier aggregation can be used to aggregate more or fewer carriers. Moreover, although illustrated in the context of downlink, the aggregation scenarios are also applicable to uplink.

The first carrier aggregation scenario 34 depicts aggregation of component carriers that are contiguous and located within the same frequency band. Additionally, the second carrier aggregation scenario 35 and the third carrier aggregation scenario 36 illustrates two examples of aggregation that are non-contiguous, but located within the same frequency band. Furthermore, the fourth carrier aggregation scenario 37 and the fifth carrier aggregation scenario 38 illustrates two examples of aggregation in which component carriers that are non-adjacent in frequency and in multiple frequency bands are aggregated. As a number of aggregated component carriers increases, a complexity of possible carrier aggregation scenarios also increases.

With reference to FIGS. 2A-2C, the individual component carriers used in carrier aggregation can be of a variety of frequencies, including, for example, frequency carriers in the same band or in multiple bands. Additionally, carrier aggregation is applicable to implementations in which the individual component carriers are of about the same bandwidth as well as to implementations in which the individual component carriers have different bandwidths.

Certain communication networks allocate a particular user device with a primary component carrier (PCC) or anchor carrier for uplink and a PCC for downlink. Additionally, when the mobile device communicates using a single frequency carrier for uplink or downlink, the user device communicates using the PCC. To enhance bandwidth for uplink communications, the uplink PCC can be aggregated with one or more uplink secondary component carriers (SCCs). Additionally, to enhance bandwidth for downlink communications, the downlink PCC can be aggregated with one or more downlink SCCs.

In certain implementations, a communication network provides a network cell for each component carrier. Additionally, a primary cell can operate using a PCC, while a secondary cell can operate using a SCC. The primary and second cells may have different coverage areas, for instance, due to differences in frequencies of carriers and/or network environment.

License assisted access (LAA) refers to downlink carrier aggregation in which a licensed frequency carrier associated with a mobile operator is aggregated with a frequency carrier in unlicensed spectrum, such as WiFi. LAA employs a downlink PCC in the licensed spectrum that carries control and signaling information associated with the communication link, while unlicensed spectrum is aggregated for wider downlink bandwidth when available. LAA can operate with dynamic adjustment of secondary carriers to avoid WiFi users and/or to coexist with WiFi users. Enhanced license assisted access (eLAA) refers to an evolution of LAA that aggregates licensed and unlicensed spectrum for both downlink and uplink.

Figure 3A:
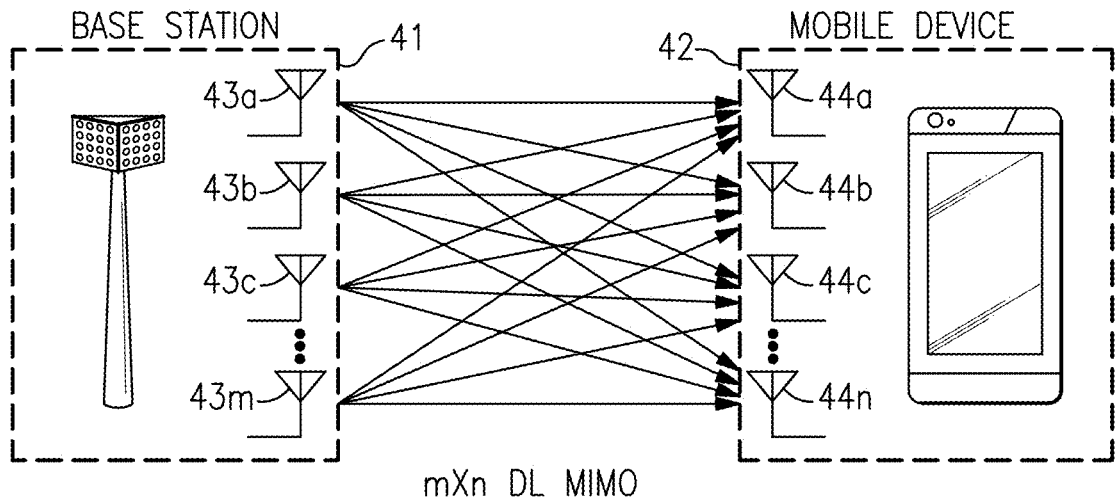
FIG. 3A is a schematic diagram of one example of a downlink channel using multi-input and multi-output (MIMO) communications.
Figure 3B:
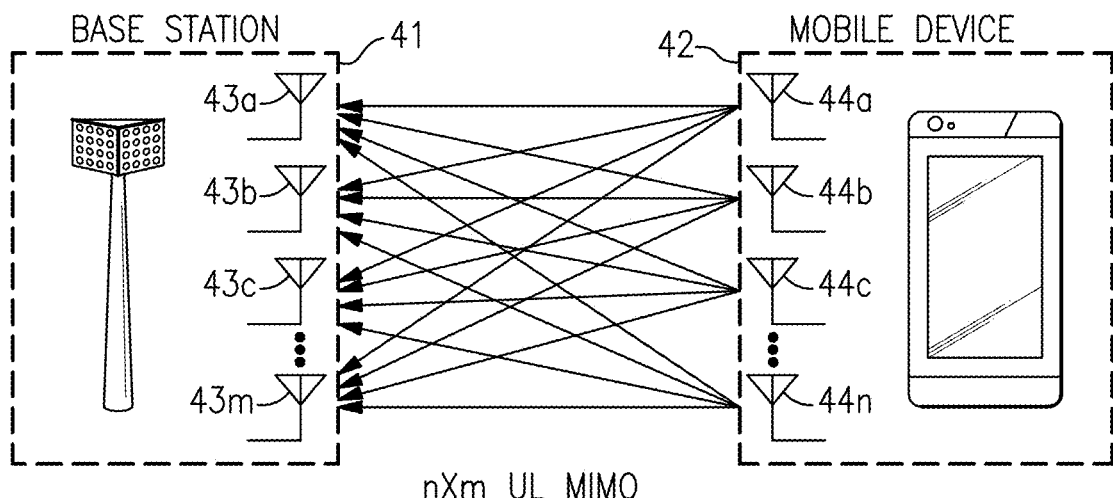
FIG. 3B is schematic diagram of one example of an uplink channel using MIMO communications.

FIG. 3A is a schematic diagram of one example of a downlink channel using multi-input and multi-output (MIMO) communications. FIG. 3B is schematic diagram of one example of an uplink channel using MIMO communications.

MIMO communications use multiple antennas for simultaneously communicating multiple data streams over common frequency spectrum. In certain implementations, the data streams operate with different reference signals to enhance data reception at the receiver. MIMO communications benefit from higher SNR, improved coding, and/or reduced signal interference due to spatial multiplexing differences of the radio environment.

MIMO order refers to a number of separate data streams sent or received. For instance, MIMO order for downlink communications can be described by a number of transmit antennas of a base station and a number of receive antennas for UE, such as a mobile device. For example, two-by-two (2×2) DL MIMO refers to MIMO downlink communications using two base station antennas and two UE antennas. Additionally, four-by-four (4×4) DL MIMO refers to MIMO downlink communications using four base station antennas and four UE antennas.

In the example shown in FIG. 3A, downlink MIMO communications are provided by transmitting using M antennas 43a, 43b, 43c, . . . 43m of the base station 41 and receiving using N antennas 44a, 44b, 44c, . . . 44n of the mobile device 42. Accordingly, FIG. 3A illustrates an example of m×n DL MIMO.

Likewise, MIMO order for uplink communications can be described by a number of transmit antennas of UE, such as a mobile device, and a number of receive antennas of a base station. For example, 2×2 UL MIMO refers to MIMO uplink communications using two UE antennas and two base station antennas. Additionally, 4×4 UL MIMO refers to MIMO uplink communications using four UE antennas and four base station antennas.

In the example shown in FIG. 3B, uplink MIMO communications are provided by transmitting using N antennas 44a, 44b, 44c, . . . 44n of the mobile device 42 and receiving using M antennas 43a, 43b, 43c, . . . 43m of the base station 41. Accordingly, FIG. 3B illustrates an example of n×m UL MIMO.

By increasing the level or order of MIMO, bandwidth of an uplink channel and/or a downlink channel can be increased.

MIMO communications are applicable to communication links of a variety of types, such as FDD communication links and TDD communication links.

Figure 3C:
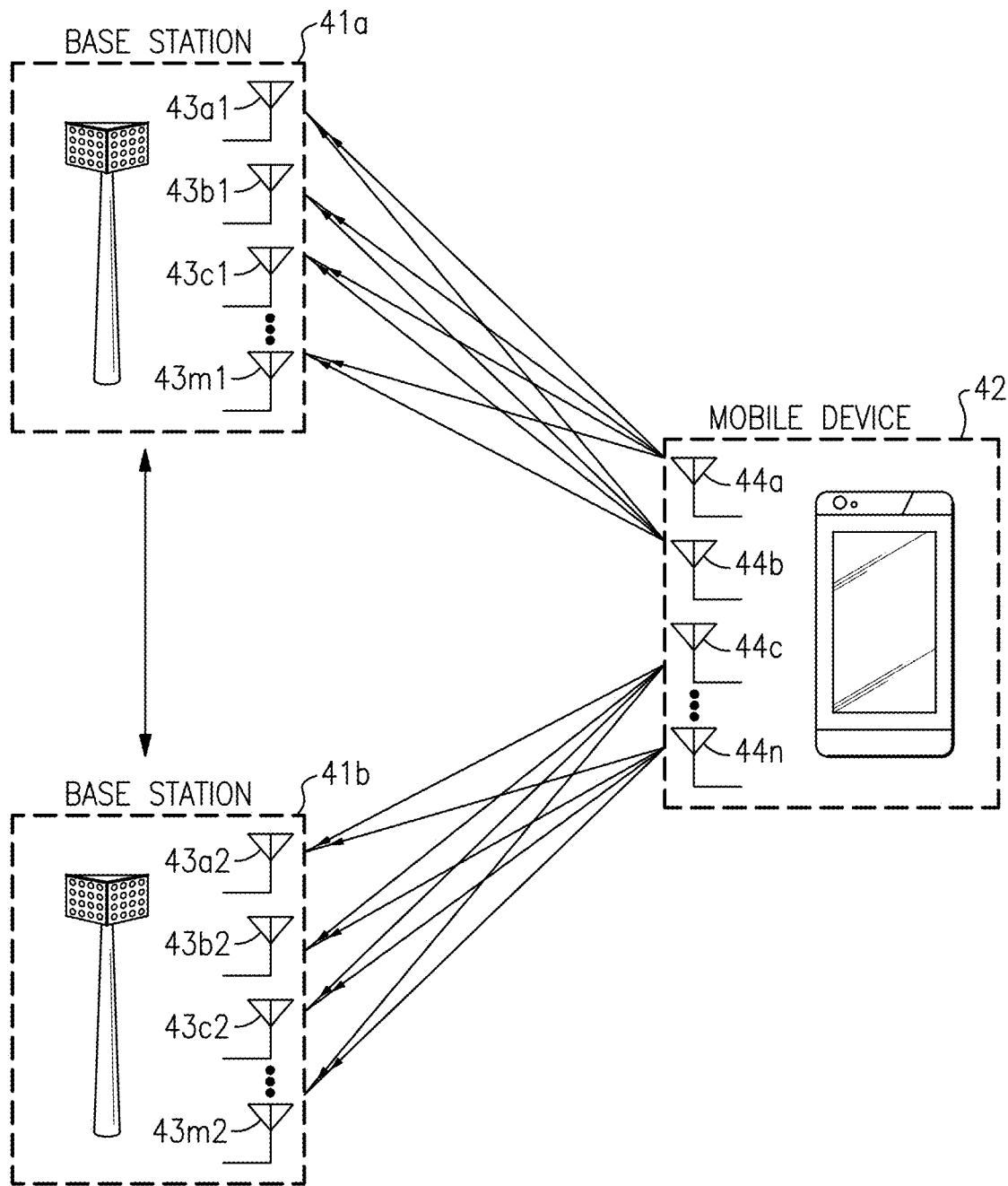
FIG. 3C is schematic diagram of another example of an uplink channel using MIMO communications.

FIG. 3C is schematic diagram of another example of an uplink channel using MIMO communications. In the example shown in FIG. 3C, uplink MIMO communications are provided by transmitting using N antennas 44a, 44b, 44c, . . . 44n of the mobile device 42. Additional a first portion of the uplink transmissions are received using M antennas 43a1, 43b1, 43c1, . . . 43m1 of a first base station 41a, while a second portion of the uplink transmissions are received using M antennas 43a2, 43b2, 43c2, . . . 43m2 of a second base station 41b. Additionally, the first base station 41a and the second base station 41b communication with one another over wired, optical, and/or wireless links.

The MIMO scenario of FIG. 3C illustrates an example in which multiple base stations cooperate to facilitate MIMO communications.

Figure 4:
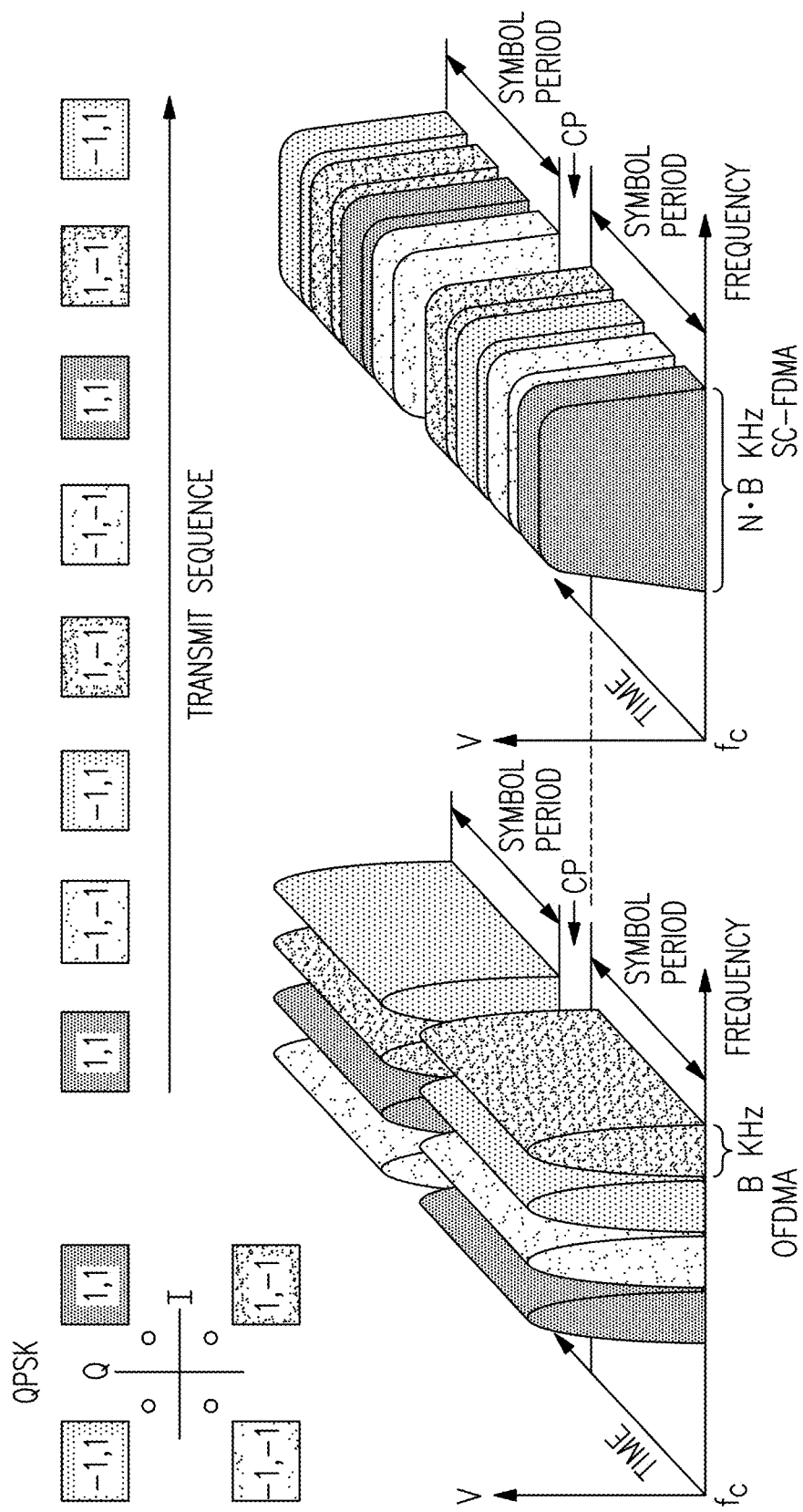
FIG. 4 is a schematic diagram illustrating two examples of multiple access schemes for a communication network.

FIG. 4 is a schematic diagram illustrating two examples of multiple access schemes for a communication network. Examples of frequency versus voltage versus time for OFDMA and SC-FDMA are depicted in FIG. 4.

The examples are shown for an illustrated transmit sequence of different QPSK modulating data symbols, in this embodiment. As shown in FIG. 4, SC-FDMA includes data symbols occupying greater bandwidth (N*B KHz, where N=4 in this example) relative to OFDMA data symbols (B KHz). However, the SC-FDMA data symbols occupy the greater bandwidth for a fraction of time (1/N) relative to that of the OFDMA data symbols. FIG. 4 has also been annotated to show times of transmitting a cyclic prefix (CP).

Figure 5A:
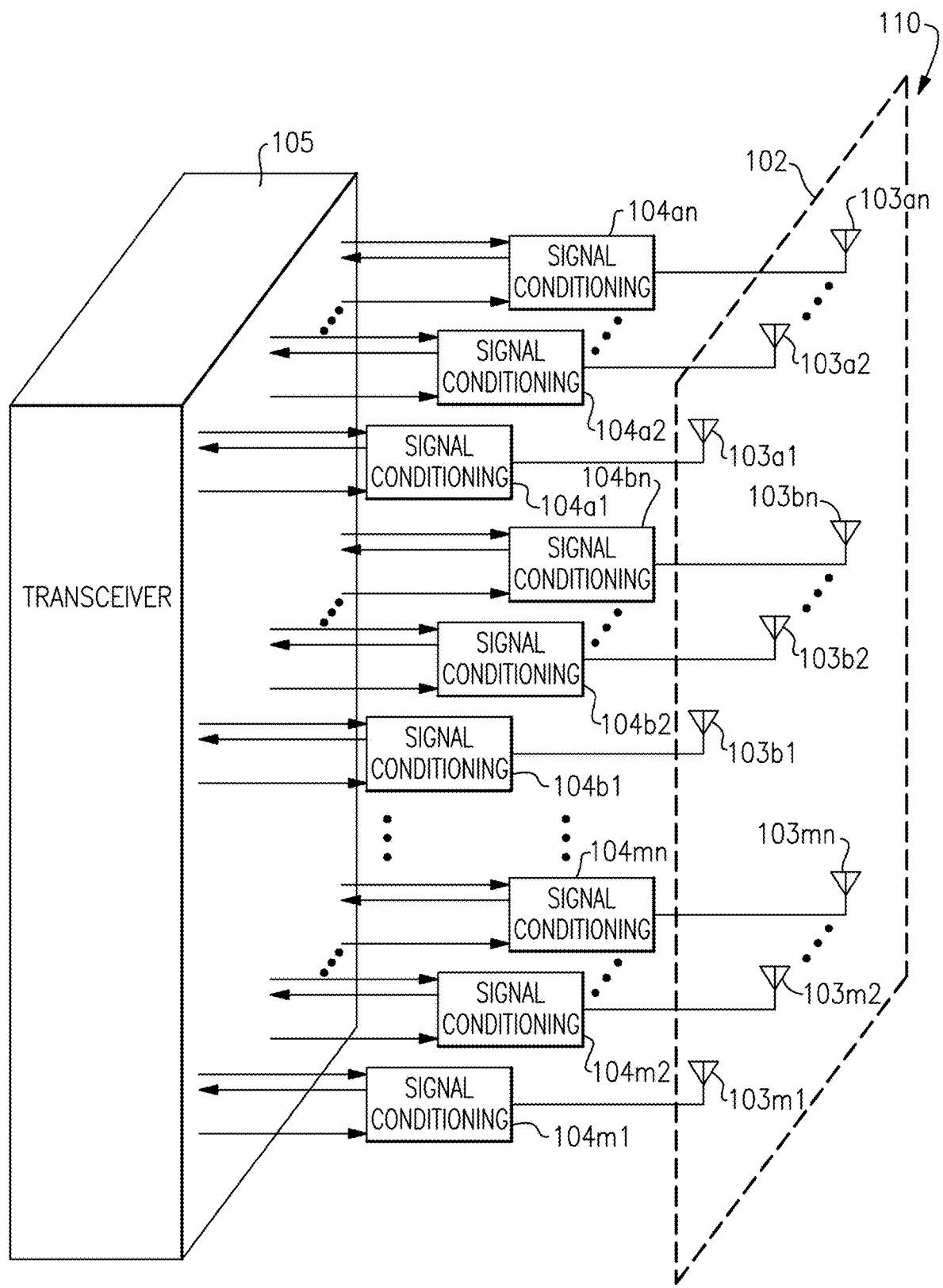
FIG. 5A is a schematic diagram of one example of a communication system that operates with beamforming.

FIG. 5A is a schematic diagram of one example of a communication system 110 that operates with beamforming.

The communication system 110 includes a transceiver 105, signal conditioning circuits 104a1, 104a2 . . . 104an, 104b1, 104b2 . . . 104bn, 104m1, 104m2 . . . 104mn, and an antenna array 102 that includes antenna elements 103a1, 103a2 . . . 103an, 103b1, 103b2 . . . 103bn, 103m1, 103m2 . . . 103mn.

Communications systems that communicate using millimeter wave carriers (for instance, 30 GHz to 300 GHz), centimeter wave carriers (for instance, 3 GHz to 30 GHz), and/or other frequency carriers can employ an antenna array to provide beam formation and directivity for transmission and/or reception of signals.

For example, in the illustrated embodiment, the communication system 110 includes an array 102 of m×n antenna elements, which are each controlled by a separate signal conditioning circuit, in this embodiment. As indicated by the ellipses, the communication system 110 can be implemented with any suitable number of antenna elements and signal conditioning circuits.

With respect to signal transmission, the signal conditioning circuits can provide transmit signals to the antenna array 102 such that signals radiated from the antenna elements combine using constructive and destructive interference to generate an aggregate transmit signal exhibiting beam-like qualities with more signal strength propagating in a given direction away from the antenna array 102.

In the context of signal reception, the signal conditioning circuits process the received signals (for instance, by separately controlling received signal phases) such that more signal energy is received when the signal is arriving at the antenna array 102 from a particular direction. Accordingly, the communication system 110 also provides directivity for reception of signals.

The relative concentration of signal energy into a transmit beam or a receive beam can be enhanced by increasing the size of the array. For example, with more signal energy focused into a transmit beam, the signal is able to propagate for a longer range while providing sufficient signal level for RF communications. For instance, a signal with a large proportion of signal energy focused into the transmit beam can exhibit high effective isotropic radiated power (EIRP).

In the illustrated embodiment, the transceiver 105 provides transmit signals to the signal conditioning circuits and processes signals received from the signal conditioning circuits. As shown in FIG. 5A, the transceiver 105 generates control signals for the signal conditioning circuits. The control signals can be used for a variety of functions, such as controlling the gain and phase of transmitted and/or received signals to control beamforming.

Figure 5B:
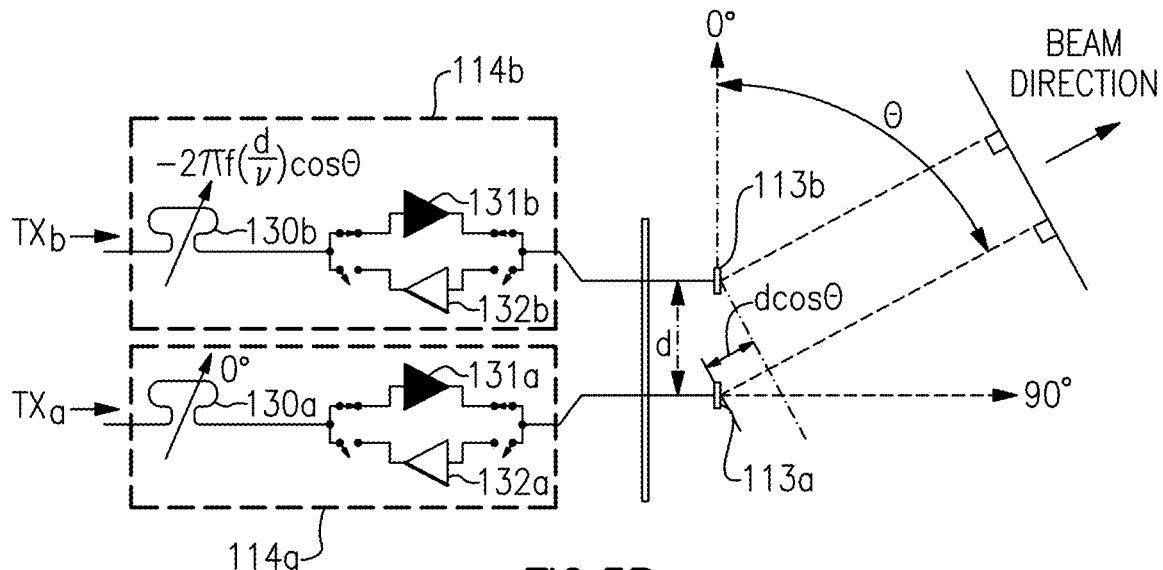
FIG. 5B is a schematic diagram of one example of beamforming to provide a transmit beam.

FIG. 5B is a schematic diagram of one example of beamforming to provide a transmit beam. FIG. 5B illustrates a portion of a communication system including a first signal conditioning circuit 114a, a second signal conditioning circuit 114b, a first antenna element 113a, and a second antenna element 113b.

Although illustrated as included two antenna elements and two signal conditioning circuits, a communication system can include additional antenna elements and/or signal conditioning circuits. For example, FIG. 5B illustrates one embodiment of a portion of the communication system 110 of FIG. 5A.

The first signal conditioning circuit 114a includes a first phase shifter 130a, a first power amplifier 131a, a first low noise amplifier (LNA) 132a, and switches for controlling selection of the power amplifier 131a or LNA 132a. Additionally, the second signal conditioning circuit 114b includes a second phase shifter 130b, a second power amplifier 131b, a second LNA 132*b*, and switches for controlling selection of the power amplifier 131*b* or LNA 132*b*.

Although one embodiment of signal conditioning circuits is shown, other implementations of signal conditioning circuits are possible. For instance, in one example, a signal conditioning circuit includes one or more band filters, duplexers, and/or other components.

In the illustrated embodiment, the first antenna element 113*a* and the second antenna element 113*b* are separated by a distance d. Additionally, FIG. 5B has been annotated with an angle θ, which in this example has a value of about 90° when the transmit beam direction is substantially perpendicular to a plane of the antenna array and a value of about 0° when the transmit beam direction is substantially parallel to the plane of the antenna array.

By controlling the relative phase of the transmit signals provided to the antenna elements 113*a*, 113*b*, a desired transmit beam angle θ can be achieved. For example, when the first phase shifter 130*a* has a reference value of 0°, the second phase shifter 130*b* can be controlled to provide a phase shift of about $-2\pi f(d/v)\cos\theta$ radians, where f is the fundamental frequency of the transmit signal, d is the distance between the antenna elements, v is the velocity of the radiated wave, and π is the mathematic constant pi.

In certain implementations, the distance d is implemented to be about ½λ, where λ is the wavelength of the fundamental component of the transmit signal. In such implementations, the second phase shifter 130*b* can be controlled to provide a phase shift of about $-\pi\cos\theta$ radians to achieve a transmit beam angle θ.

Accordingly, the relative phase of the phase shifters 130*a*, 130*b* can be controlled to provide transmit beamforming. In certain implementations, a baseband processor and/or a transceiver (for example, the transceiver 105 of FIG. 5A) controls phase values of one or more phase shifters and gain values of one or more controllable amplifiers to control beamforming.

Figure 5C:
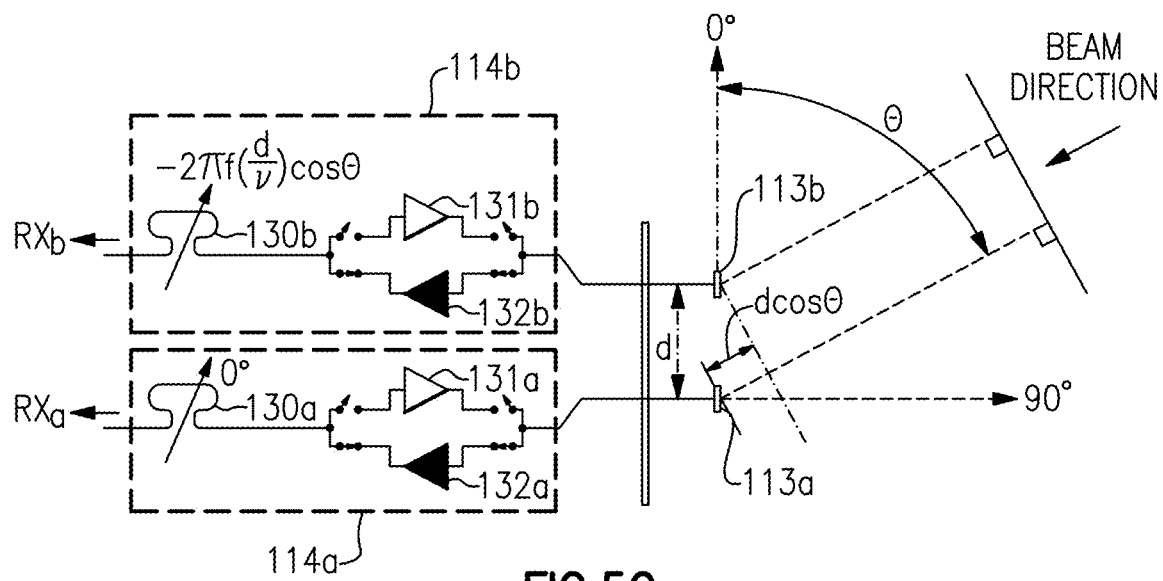
FIG. 5C is a schematic diagram of one example of beamforming to provide a receive beam.

FIG. 5C is a schematic diagram of one example of beamforming to provide a receive beam. FIG. 5C is similar to FIG. 5B, except that FIG. 5C illustrates beamforming in the context of a receive beam rather than a transmit beam.

As shown in FIG. 5C, a relative phase difference between the first phase shifter 130*a* and the second phase shifter 130*b* can be selected to about equal to $-2\pi f(d/v)\cos\theta$ radians to achieve a desired receive beam angle θ. In implementations in which the distance d corresponds to about ½λ, the phase difference can be selected to about equal to $-\pi\cos\theta$ radians to achieve a receive beam angle θ.

Although various equations for phase values to provide beamforming have been provided, other phase selection values are possible, such as phase values selected based on implementation of an antenna array, implementation of signal conditioning circuits, and/or a radio environment.

Sounding Reference Signal Switching

In cellular networks, such as 5G networks, sounding reference signal (SRS) features can be enabled to determine channel qualities of a communication link between UE (for example, a wireless device such as a mobile phone) and a base station. SRS symbols are transmitted on uplink and processed by the network to estimate the quality of the wireless channel at different frequencies. For instance, the SRS symbols transmitted by the UE can be used by the base station to estimate the quality of the uplink channel for large bandwidths outside the assigned frequency span to the UE.

Although SRS provides a number of benefits, SRS also places a burden on data transport capacity.

For example, for 3GPP 5G Release 15, ON to ON timing for consecutive SRS symbols is 15 microseconds (μs) for Frequency Range 1 (FR1). For a subcarrier spacing (SCS) of 15 kilohertz (kHz), the cyclic prefix (CP) and 10 μs of the preceding data symbol is consumed. At 30 kHz and 60 kHz SCS 15 μs the ON to ON timing constraint corresponds to about half a symbol and a full symbol, respectively. Thus, a full symbol can be lost or blanked when 30 kHz or 60 kHz SCS is enabled.

Apparatus and methods for SRS switching are provided. In certain embodiments, transmit path resources of UE are used to reduce or eliminate the impairment of SRS upon transport capacity. Furthermore, the transmit path resources can be used for other purposes, and thus SRS switching time can be reduced by re-using transmit path resources that may be included for other purposes. The teachings herein can be used to achieve SRS switching of 0 μs, thereby eliminating the impact of switching timing constraints for SRS symbols on transport capacity.

In certain implementations, the UE includes a first transmit path associated with a first power amplifier, and a second transmit path associated with a second power amplifier. Additionally, when the second transmit path is not in use for other purposes, symbol transmissions are staggered using the first transmit path and the second transmit path, with at least the second transmit path used for transmitting SRS symbols. Thus, a power amplifier associated with an antenna not in operation for data transport can be used for SRS signaling. Implementing SRS in this manner can provide a number of advantages, including, but not limited to, 0 μs SRS switching.

In certain implementations, the first transmit path and the second transmit path correspond to transmit paths used for transmitting MIMO signals. For example, in the context of a UE capable of UL MIMO and not in MIMO mode, the first power amplifier (PA1) is used for data transport activities while the second power amplifier (PA2) is engaged for SRS.

Thus, a UE capable of UL MIMO and not in MIMO mode alternates transmit path resources to provide SRS. By using the other power amplifier, SRS can be achieved without overhead on data transport.

Such low overhead provides a number of advantages. For example, 0 μs SRS switching can be realized to achieve lower latency and enhanced performance relative to an implementation in which time is set aside to permit SRS on a particular antenna by shortening or blanking a symbol.

FIG. 6A is a diagram depicting two examples of symbol blanking for time slots including SRS symbols. The depicted transmit sequences show the sequence of transmitted symbols, starting on the left and ending on the right.

Certain cellular networks are implemented with an uplink physical layer that includes multiple physical channels. In one example, a cellular network includes a Physical Uplink Shared Channel (PUSCH) and a Physical Uplink Control Channel (PUCCH). Additionally, the PUSCH is used for transmitting user traffic data, while PUCCH carriers Uplink Control Information (UCI) indicating channel quality and other parameters.

The left-hand side of FIG. 6A depicts an example of a first time slot in which a transmit sequence includes three initial PUSCH/PUCCH symbols transmitted on a first antenna, followed by a first SRS symbol on the first antenna, followed by a blank symbol (GAP), and followed by a second SRS symbol on a second antenna. The right-hand side of FIG. 6A depicts an example of a second time slot in which two PUSCH/PUCCH symbols, a first blank symbol, a first SRS symbol, a second blank symbol, and a second SRS symbol are transmitted using various antennas as indicated.

Table 1 below shows one example of SCS and symbol blanking versus numerology.

TABLE 1

| numerology | SCS [kHz] | Y [symbol] |
|---|---|---|
| 0 | 15 | 1 |
| 1 | 30 | 1 |
| 2 | 60 | 1 |
| 3 | 120 | 2 |

In this example, one symbol blanking is permitted for SCS of 30 kHz and SCS of 60 kHz. Additionally, two symbol blanking is permitted for SCS of 120 kHz.

FIG. 6B is a table depicting one example of symbol duration versus SCS. The table depicts symbol duration for half of a time slot.

Figure 15:
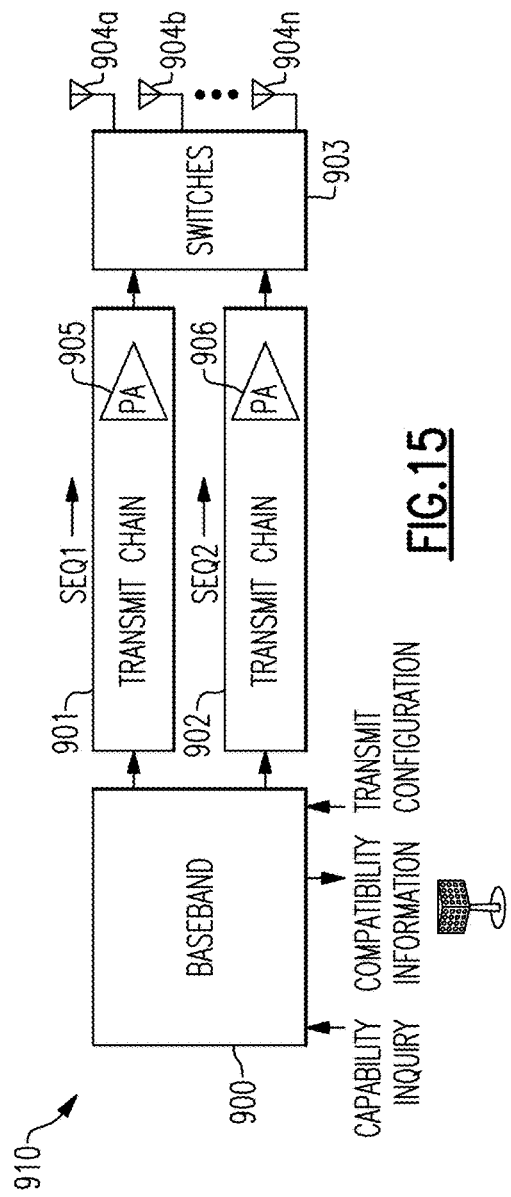
FIG. 15 is a schematic diagram of one embodiment of an RF communication system.

As shown in FIG. 6B, 15 kHz SCS operates with a first OFDM symbol that is 16TS (0.521 μs for SCS of 15 kHz) longer than each of the other symbols in the time slot. The table includes information for SCS of 15 kHz, 30 kHz, and 60 kHz. As shown in the table, symbol duration scales linearly with SCS.

Figures 6C, 6D:
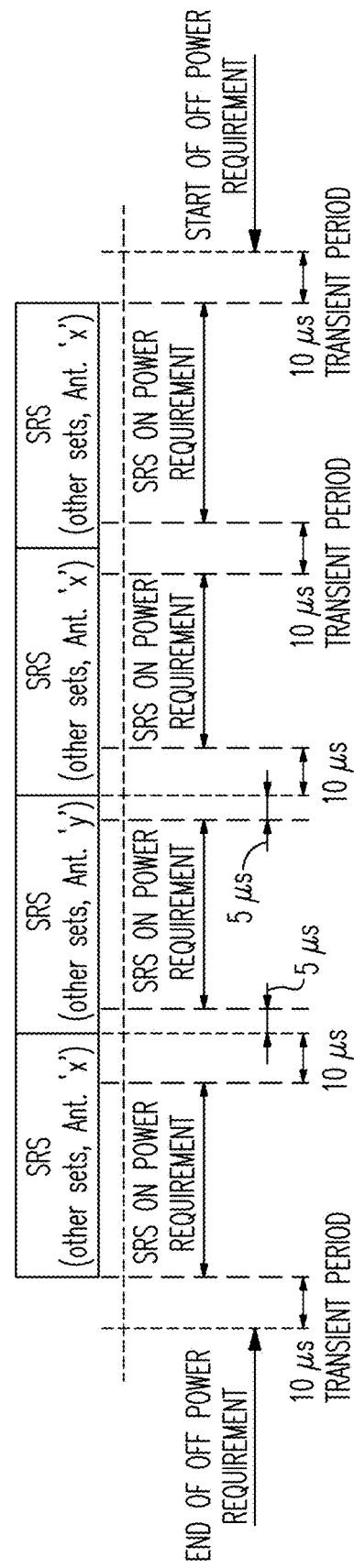
FIG. 6C is a table depicting one example of various communication parameters versus SCS.
FIG. 6D is a diagram of one example of ON to ON timing for SRS.

FIG. 6C is a table depicting one example of various communication parameters versus SCS.

In the example shown in FIG. 6C, CP scales linearly with SCS.

FIG. 6D is a diagram of one example of ON to ON timing for SRS.

As shown in FIG. 6D, SRS symbol used during switching (port 'y') is truncated by 5 μs+5 μs=10 μs. The first 5 μs CP duration at SCS of 15 kHz, while the second 5 μs arises from symbol impairment. Additionally, SRS symbols on prior and post switching transients suffer from 10 μs+5 μs=15 μs penalty.

ON to ON timing for consecutive SRS symbols is 15 μs for FR1 in Release 15 of 5G. For an SCS of 15 kHz, the CP is consumed and 10 μs of the preceding data symbol is consumed. At 30 kHz and 60 kHz SCS 15 μs of ON to ON timing corresponds to about half a symbol and a full symbol, respectively. Thus, a full symbol can be lost or blanked when 30 kHz or 60 kHz SCS is enabled.

Moreover, in Release 15, symbol blanking is the default assumption for all UE types. Thus, uRLLC performance is degraded when scheduler applies SRS default symbol blanking to all UE types.

In certain implementations, the UE provides binary reporting of SRS switching latency. In one example, the binary reporting includes four states: 0 μs/less than 3 μs/less than 5 μs/less than 15 μs. In certain implementations, binary reporting is provided per frequency band.

Figure 7A:
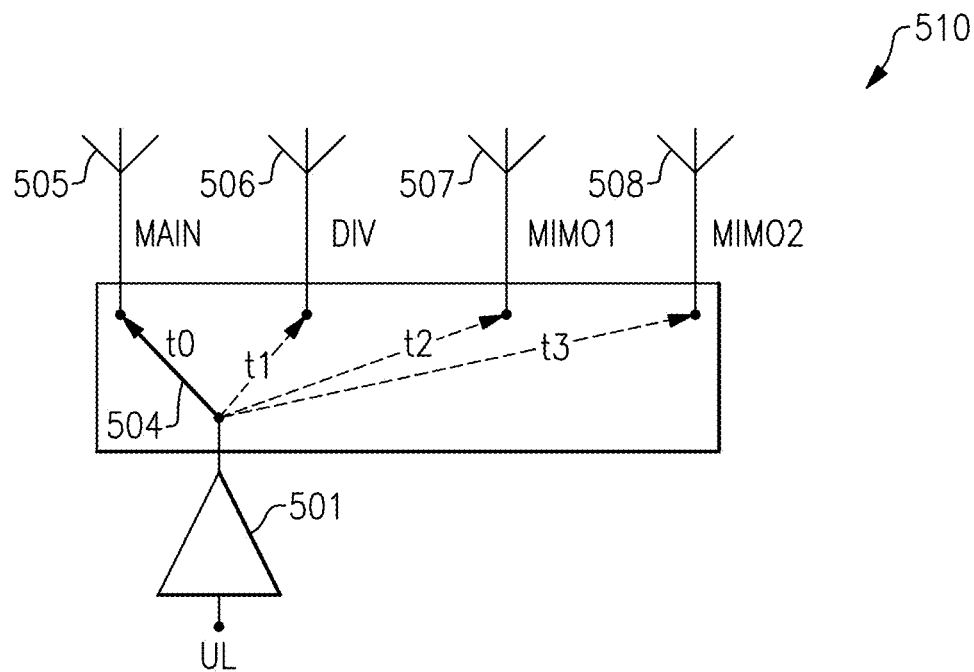
FIG. 7A is a schematic diagram of one example of a communication system operating with SRS for one transmit four receive (1T4R).
Figure 7B:
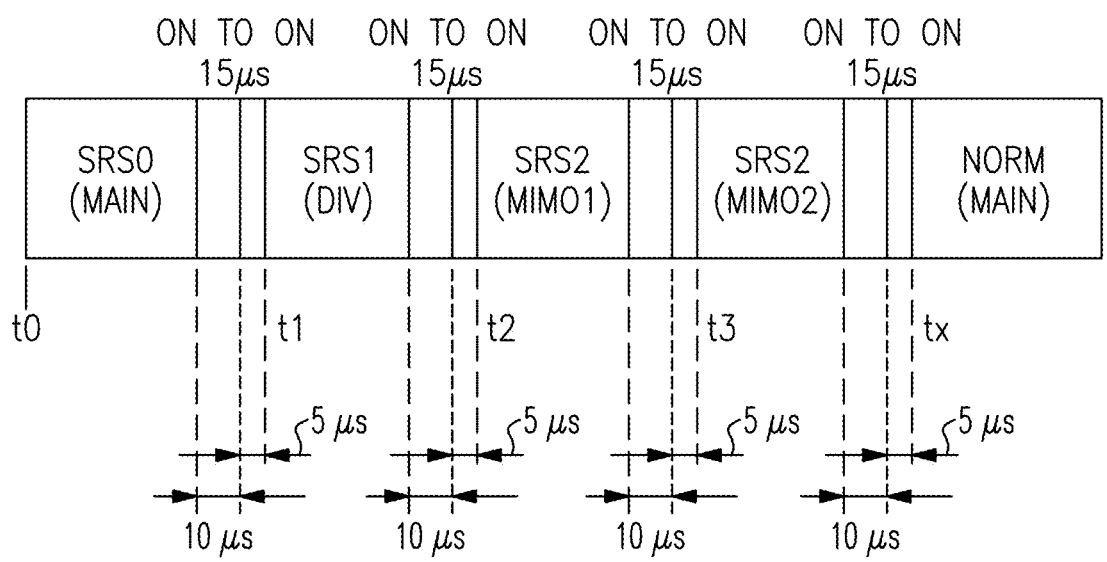
FIG. 7B is one example of a timing diagram for the communication system of FIG. 7A.

FIG. 7A is a schematic diagram of one example of a communication system 510 operating with SRS for one transmit four receive (1T4R). FIG. 7B is one example of a timing diagram for the communication system 510 of FIG. 7A.

With reference to FIGS. 7A and 7B, the communication system 510 includes a power amplifier 501 that is connected to a main antenna 505, a diversity antenna 506, a first MIMO antenna 507, and a second MIMO antenna 508 by a multi-throw switch 504.

When sounding all four antennas 503-506 at 15 kHz SCS, 4 symbols are used with whole CP and 10 μs of the preceding symbol affected. For 30 kHz and 60 kHz SCS, 7 symbols are used, 3 of which are blanks.

Figure 8A:
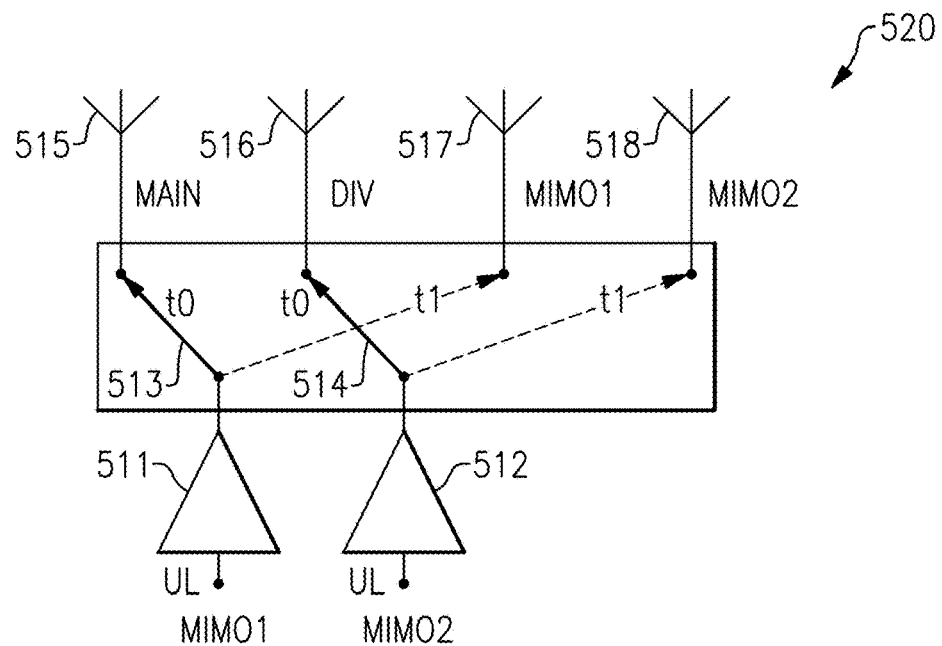
FIG. 8A is a schematic diagram of one example of a communication system operating with SRS for two transmit four receive (2T4R).
Figure 8B:
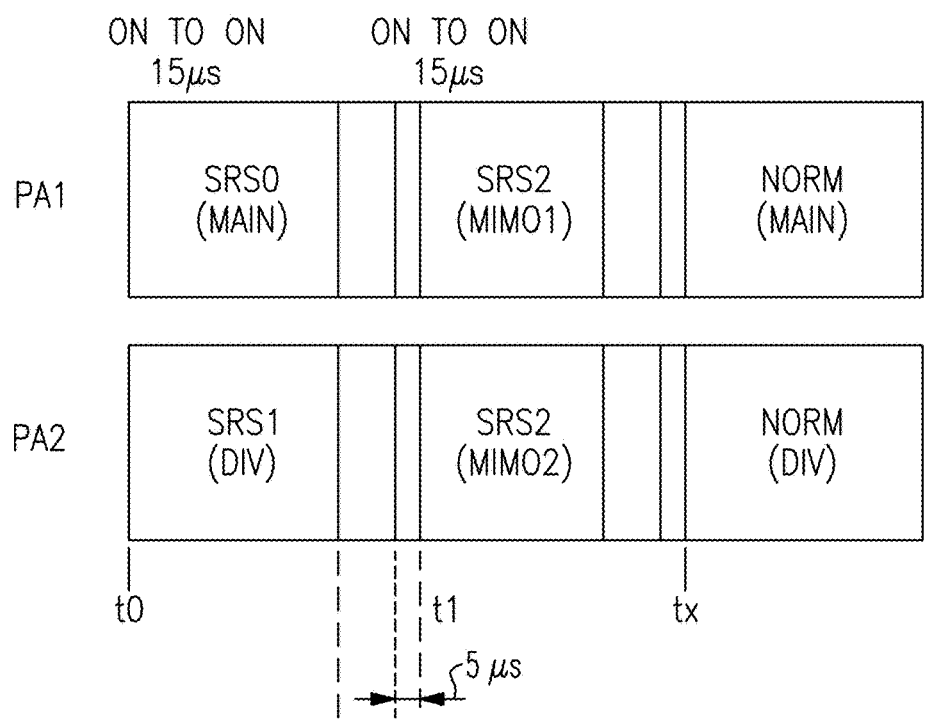
FIG. 8B is one example of a timing diagram for the communication system of FIG. 8A.

FIG. 8A is a schematic diagram of one example of a communication system 520 operating with SRS for two transmit four receive (2T4R). FIG. 8B is one example of a timing diagram for the communication system 520 of FIG. 8A.

With reference to FIGS. 8A and 8B, the communication system 520 includes a first power amplifier 511 that is connected to a main antenna 515 and a first MIMO antenna 517 by a first multi-throw switch 513. Additionally, the communication system 520 further includes a second power amplifier 512 that is connected to a diversity antenna 516 and a second MIMO antenna 518 by a second multi-throw switch 514.

When sounding all four antennas 515-518 at 15 kHz SCS, 2 symbols are used with whole CP and 10 μs of preceding symbol affected. For 30 kHz and 60 kHz SCS, 4 symbols are used, 2 of which are blanks.

Figure 9A:
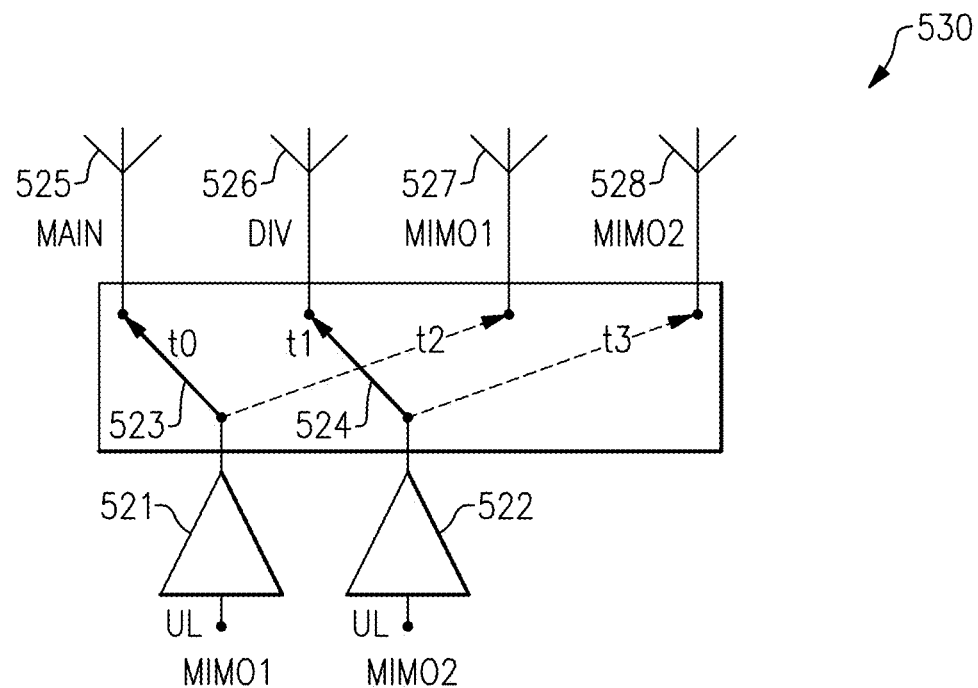
FIG. 9A is a schematic diagram of one embodiment of a communication system operating with SRS for 2T4R.
Figure 9B:
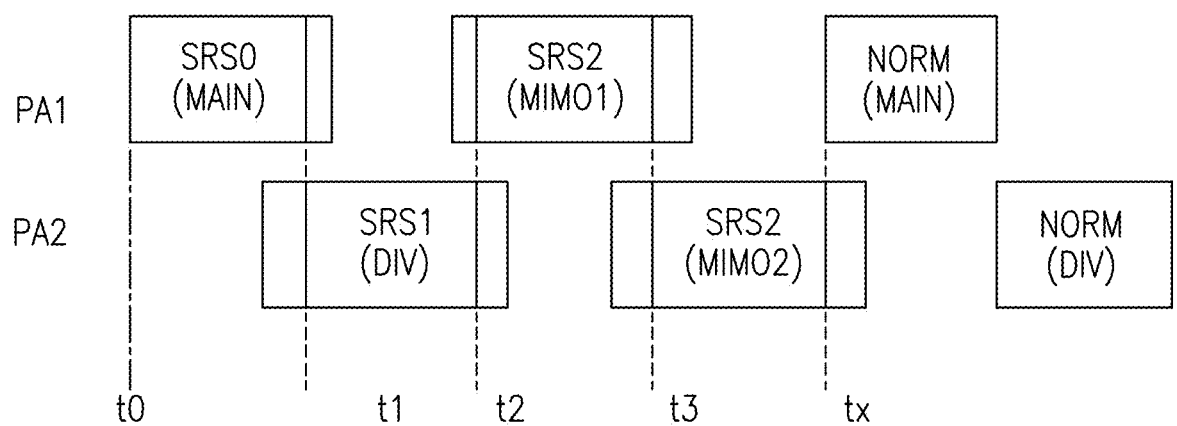
FIG. 9B is one example of a timing diagram for the communication system of FIG. 9A.

FIG. 9A is a schematic diagram of one embodiment of a communication system 530 operating with SRS for 2T4R. FIG. 9B is one example of a timing diagram for the communication system 530 of FIG. 9A.

With reference to FIGS. 9A and 9B, the communication system 530 includes a first power amplifier 521 that is connected to a main antenna 525 and a first MIMO antenna 527 by a first multi-throw switch 523. Additionally, the communication system 530 further includes a second power amplifier 522 that is connected to a diversity antenna 526 and a second MIMO antenna 528 by a second multi-throw switch 524.

When sounding all four antennas 525-528 at 15 kHz SCS, 4 symbols are used with SRS switching of about 0 μs. For 30 kHz and 60 kHz SCS, 4 symbols are used, with no blanks and SRS switching of about 0 μs. Moreover, the ON/OFF switching is performed with less than 10 μs when uplink MIMO is supported.

Figure 10A:
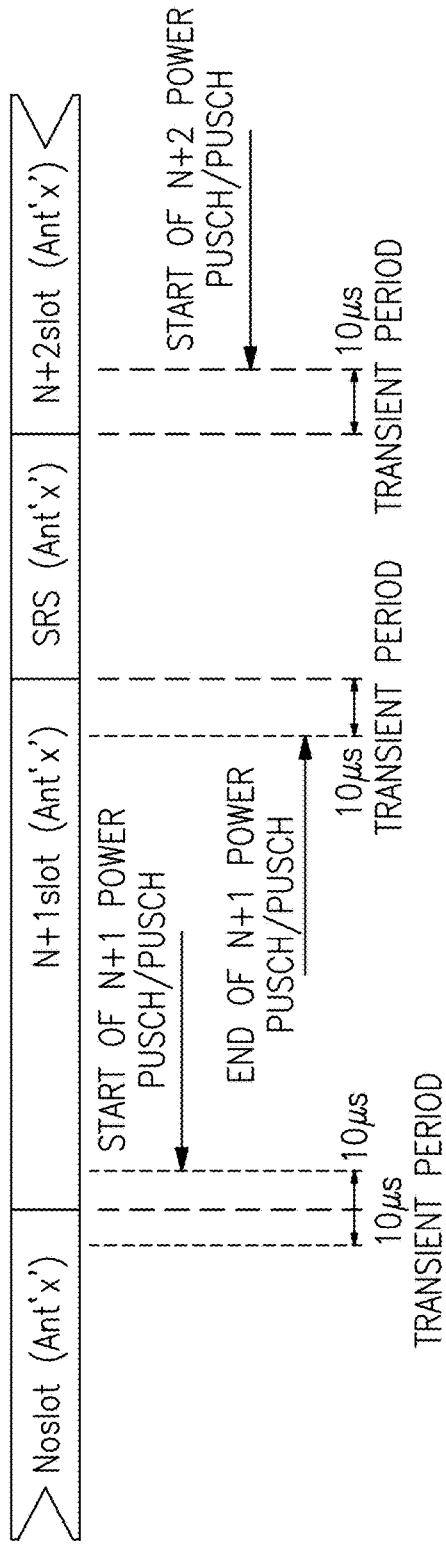
FIG. 10A is a diagram of one example of an impact of transients on an uplink physical layer.

FIG. 10A is a diagram of one example of an impact of transients on an uplink physical layer. In the example of FIG. 10A, when transitioning from a PUSCH/PUCCH symbol to an SRS symbol and then back to a PUSCH/PUCCH symbol, no antenna switching occurs (antenna 'x' used for each transmission).

Figure 10B:
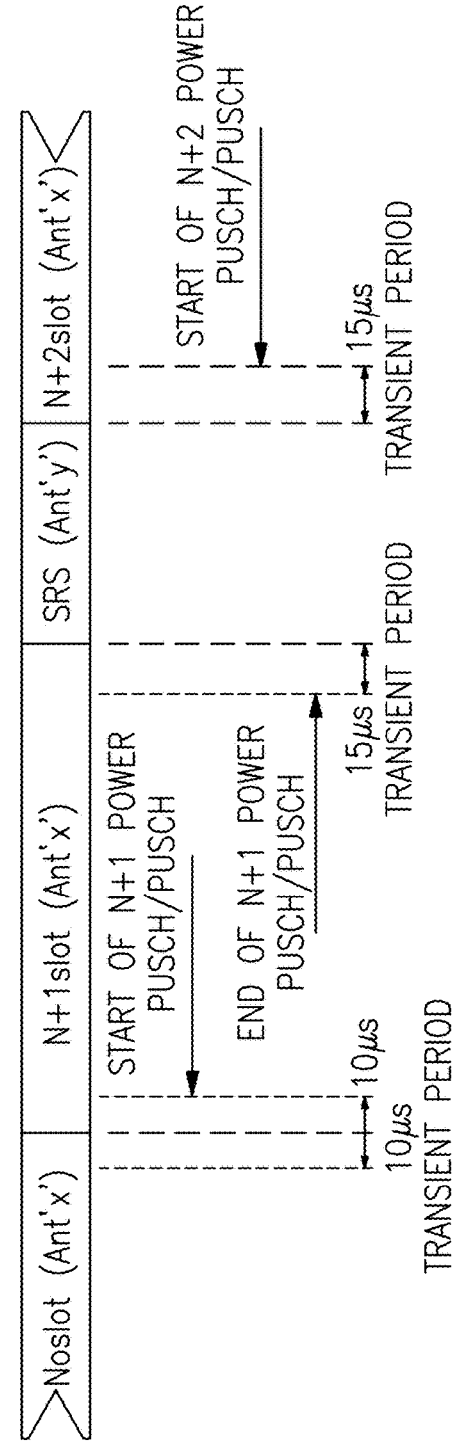
FIG. 10B is a diagram of another example of an impact of transients on an uplink physical layer.

FIG. 10B is a diagram of another example of an impact of transients on an uplink physical layer. In the example of FIG. 10B, when transitioning from a PUSCH/PUCCH symbol to an SRS symbol and then back to a PUSCH/PUCCH symbol, antenna switching occurs (from antenna 'x' to antenna 'y' and then back to antenna 'x').

FIG. 10C is a table of one example of an impact of transients on an uplink physical layer. The table depicts examples of impact of transient times on PUSCH/PUCCH symbol duration for SCS scenarios for both FR1 and FR2.

Figure 11A:
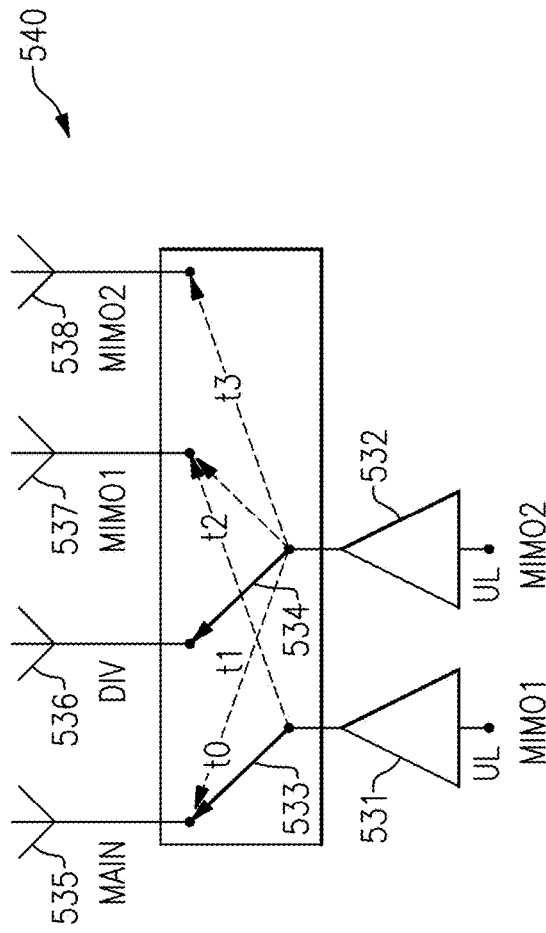
FIG. 11A is a schematic diagram of another embodiment of a communication system operating with SRS for 2T4R.
Figure 11B:
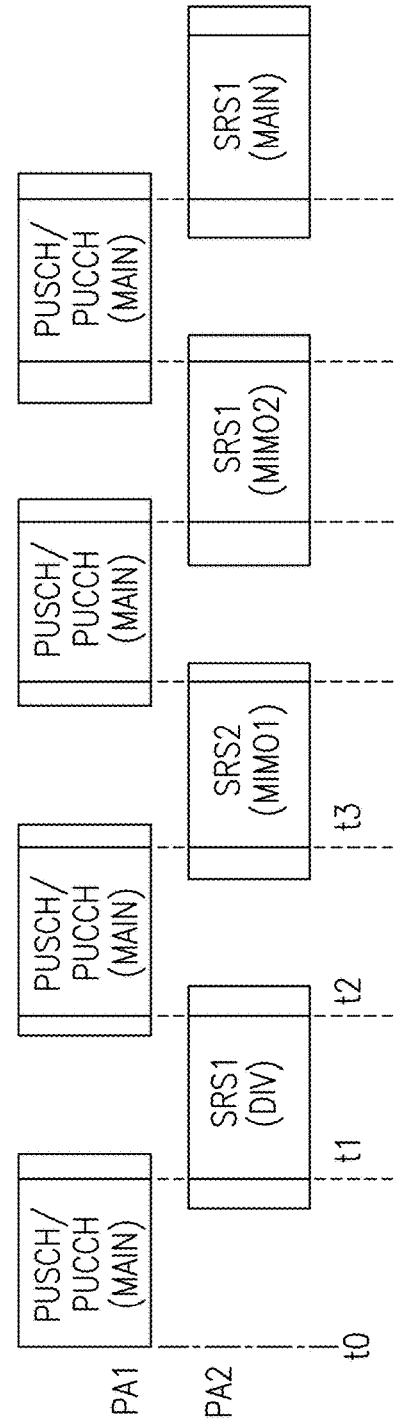
FIG. 11B is one example of a timing diagram for the communication system of FIG. 11A.

FIG. 11A is a schematic diagram of another embodiment of a communication system 540 operating with SRS for 2T4R. FIG. 11B is one example of a timing diagram for the communication system 540 of FIG. 11A.

With reference to FIGS. 11A and 11B, the communication system 540 includes a first power amplifier 531 that is connected to a main antenna 535 and a first MIMO antenna 537 by a first multi-throw switch 533. Additionally, the communication system 540 further includes a second power amplifier 532 that is connected to the main antenna 535, a diversity antenna 536, the first MIMO antenna 537, and a second MIMO antenna 538 by a second multi-throw switch 532.

In comparison to the second multi-throw switch 524 of the communication system 530 of FIG. 9A, the second multi-throw switch 534 of the communication system 540 of FIG. 11A further includes two additional throws. By including the additional throws, operability for 0 μs PUSCH/PUCCH is provided, even when the switches have a 15 μs switching time.

The timing diagram of FIG. 11B depicts SRS transient for an UL MIMO capable UE not in MIMO transmission mode.

Figure 12A:
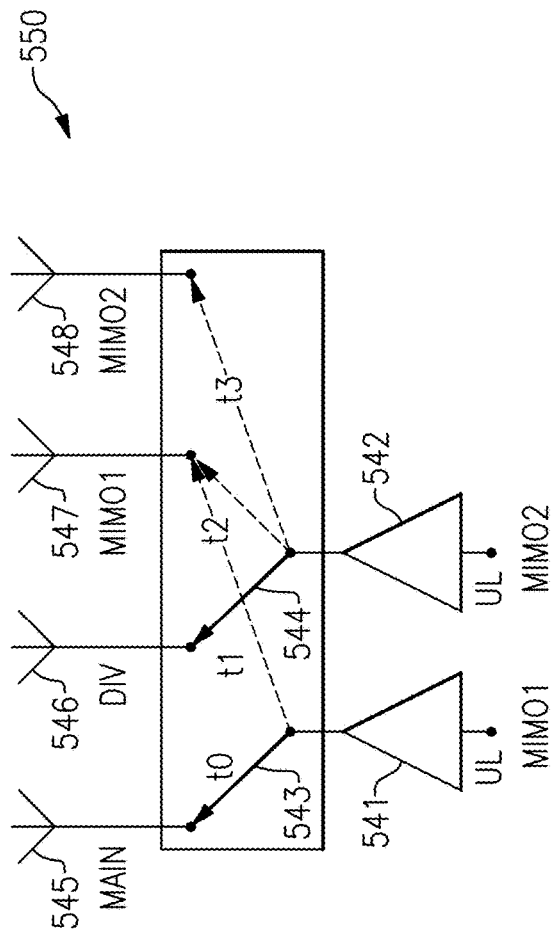
FIG. 12A is a schematic diagram of another embodiment of a communication system operating with SRS for 2T4R.
Figure 12B:
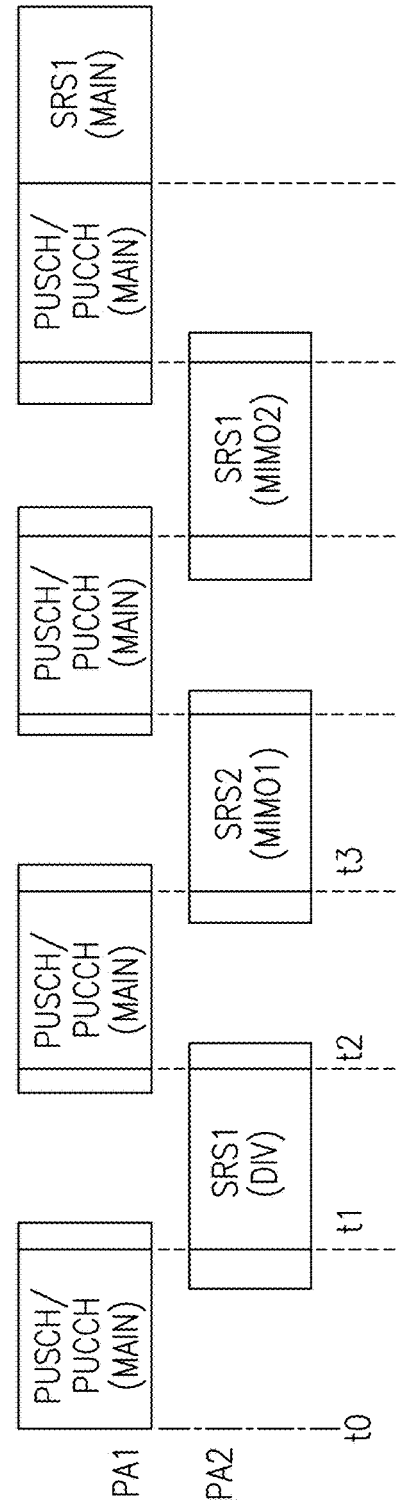
FIG. 12B is one example of a timing diagram for the communication system of FIG. 12A.

FIG. 12A is a schematic diagram of another embodiment of a communication system 550 operating with SRS for 2T4R. FIG. 12B is one example of a timing diagram for the communication system 550 of FIG. 12A.

With reference to FIGS. 12A and 12B, the communication system 550 includes a first power amplifier 541 that is connected to a main antenna 545 and a first MIMO antenna 547 by a first multi-throw switch 543. Additionally, the communication system 550 further includes a second power amplifier 542 that is connected to a diversity antenna 546, the first MIMO antenna 547, and a second MIMO antenna 548 by a second multi-throw switch 544.

The timing diagram of FIG. 12B depicts SRS transient for an UL MIMO capable UE not in MIMO transmission mode.

Figure 13:
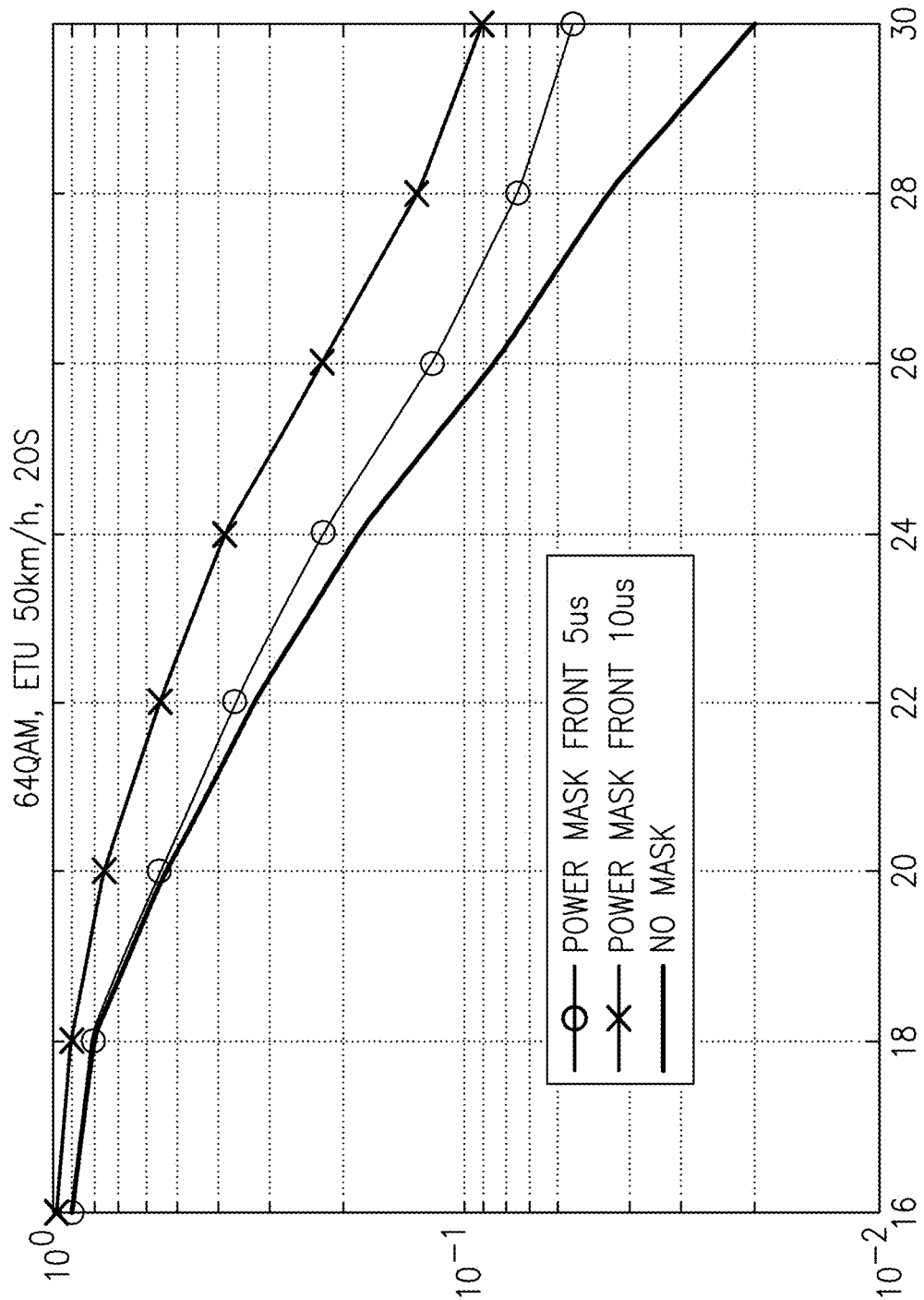
FIG. 13 is a graph of one example of uplink demodulation performance for different transient switching times.

FIG. 13 is a graph of one example of uplink demodulation performance for different transient switching times. The graph depicts an impact of power masks of various widths on uplink demodulation for an example using 64 quadrature amplitude modulation (64QAM). The plot for the case of no mask corresponds to a 0 μs transient time.

Figure 14:
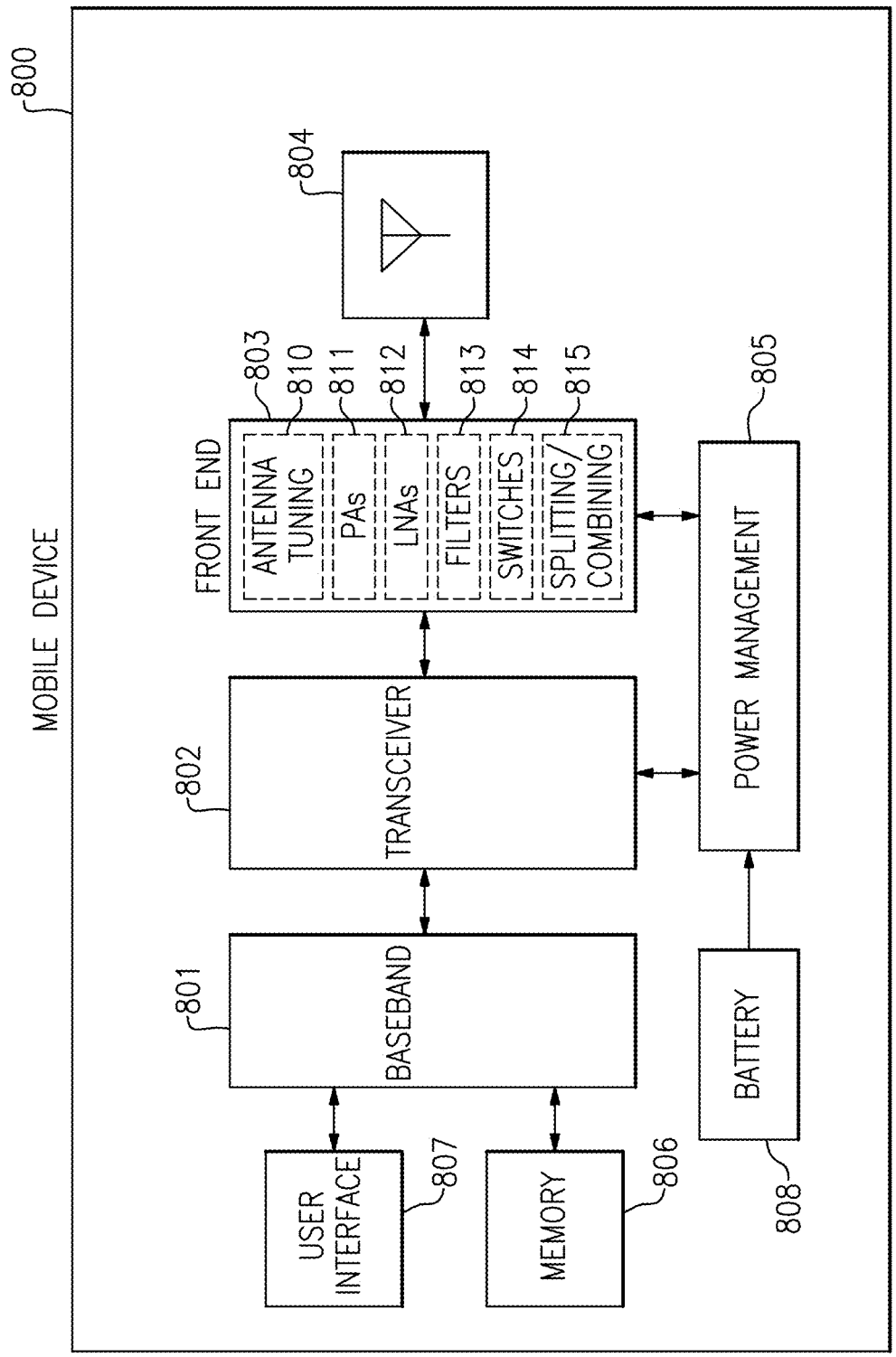
FIG. 14 is a schematic diagram of one embodiment of a mobile device.

FIG. 14 is a schematic diagram of one embodiment of a mobile device 800. The mobile device 800 includes a baseband system 801, a transceiver 802, a front end system 803, antennas 804, a power management system 805, a memory 806, a user interface 807, and a battery 808. The mobile device 800 can be implemented in accordance with any of the embodiments herein.

The mobile device 800 can be used communicate using a wide variety of communications technologies, including, but not limited to, 2G, 3G, 4G (including LTE, LTE-Advanced, and LTE-Advanced Pro), 5G NR, WLAN (for instance, WiFi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 14 as the transceiver 802. In one example, separate components (for instance, separate circuits or dies) can be provided for handling certain types of RF signals.

The front end system 803 aids is conditioning signals transmitted to and/or received from the antennas 804. In the illustrated embodiment, the front end system 803 includes antenna tuning circuitry 810, power amplifiers (PAs) 811, low noise amplifiers (LNAs) 812, filters 813, switches 814, and signal splitting/combining circuitry 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include amplifiers having controllable gain and phase shifters having controllable phase to provide beam formation and directivity for transmission and/or reception of signals using the antennas 804. For example, in the context of signal transmission, the amplitude and phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the amplitude and phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 14, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 14, the power management system 805 receives a battery voltage from the battery 808. The battery 808 can be any suitable battery for use in the mobile device 800, including, for example, a lithium-ion battery.

FIG. 15 is a schematic diagram of one embodiment of an RF communication system 910. The RF communication system 910 includes a baseband system 900, a first transmit chain 901, a second transmit chain 902, switches 903, and antennas 904a, 904b, . . . 904n. The RF communication system 910 represents a wireless device of a cellular network, such as a mobile phone. The RF communication system 910 can be implemented in accordance with any of the embodiments herein.

As shown in FIG. 15, the baseband system 900 generates a first transmit signal and a second transmit signal, which in certain implementations are represented each using a pair of in-phase (I) and quadrature-phase (Q) signals.

With continuing reference to FIG. 15, the first transmit chain 901 includes a first power amplifier 905, and the second transmit chain 902 includes a second power amplifier 906. The first power amplifier 905 is used to amplify a first RF transmit signal carrying a first sequence of symbols (SEQ1). Additionally, the second power amplifier 906 is used to amplify a second RF transmit signal carrying a second sequence of symbols (SEQ2).

As shown in FIG. 15, the switches 903 are used to selectively connect the first power amplifier 905 and the second power amplifier 906 to desired antenna(s) chosen from the antennas 904a, 904b, . . . 904n. Although the RF communication system 910 is depicted as included three antennas, more or fewer antennas can be included as indicated by the ellipses.

The baseband system 900 controls generation of the first RF transmit signal and the second RF transmit signal such that the first sequence of symbols and the second sequence of symbols are staggered with one or more sounding reference signal symbols in the second sequence of symbols in accordance with the teachings herein.

As shown in FIG. 15, the baseband system 900 is further configured to receive a base station capability inquiry from a base station, and to control transmission of capability information to the base station in response to the base station capability inquiry. In certain implementations, the baseband system 900 can further receive transmit configuration information from the base station in response to sending the compatibility information. The baseband system 900 can configure first transmit chain 901, second transmit chain 902, and/or the switches 903 based on the inquiry and/or transmit configuration information.

Figure 16:
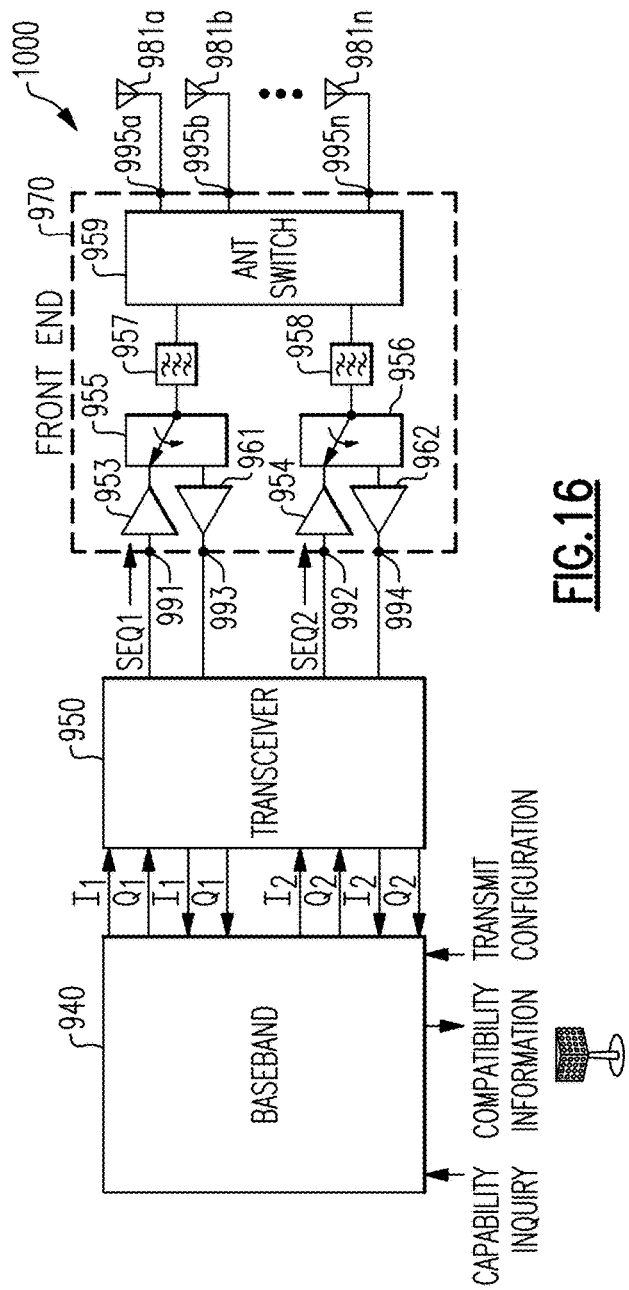
FIG. 16 is a schematic diagram of another embodiment of an RF communication system.

FIG. 16 is a schematic diagram of another embodiment of an RF communication system 1000. The RF communication system 1000 includes a baseband system 940, a transceiver 950, a front end system 970, and antennas 981a, 981b, . . . 981n. The RF communication system 1000 represents a wireless device of a cellular network, such as a mobile phone. The RF communication system 1000 can be implemented in accordance with any of the embodiments herein.

As shown in FIG. 16, the baseband system 940 generates a first pair of in-phase (I) and quadrature-phase (Q) signals representing a first transmit signal. Additionally, the baseband system 940 processes a first pair of I and Q signals representing a first receive signal. Furthermore, the baseband system 940 generates a second pair of I and Q signals representing a second transmit signal. Additionally, the baseband system 940 processes a second pair of I and Q signals representing a second receive signal.

With continuing reference to FIG. 16 the transceiver 950 modulates the first pair of I and Q signals representing the first transmit signal to generate a first RF transmit signal provided to the front end system 970 at a first transmit terminal 991. The first RF transmit signal carries a first sequence of symbols (SEQ1). Additionally, the transceiver 950 demodulates a first RF receive signal from a first receive terminal 993 of the front end system 970 to generate the first pair of I and Q signals representing the first receive signal. Furthermore, the transceiver 950 modulates the second pair of I and Q signals representing the second transmit signal to generate a second RF transmit signal provided to the front end system 970 at a second transmit terminal 992. The second RF transmit signal carriers a second sequence of symbols (SEQ2). Additionally, the transceiver 970 demodulates a second RF receive signal from a second receive terminal 994 of the front end system 970 to generate the second pair of I and Q signals representing the second receive signal.

As shown in FIG. 16, the front end system 970 includes a first power amplifier 953, a second power amplifier 954, a first transmit/receive switch 955, a second transmit/receive switch 956, a first band filter 957, a second band filter 958, an antenna switch 959, a first low noise amplifier 961, and a second low noise amplifier 962.

Although one embodiment of a front end system 970 is shown, other implementations of front end systems are possible. For example, a wide range of components and circuitry can be present between an output of a power amplifier and an antenna. Examples of such components and circuitry include, but are not limited to, switches, matching networks, harmonic termination circuits, filters, resonators, duplexers, detectors, directional couplers, bias circuitry, and/or frequency multiplexers (for instance, diplexers, triplexers, etc.). Furthermore, multiple instantiations of one or more components or circuits can be included. Moreover, a wide range of components and circuitry can be present between the transceiver and an input to a power amplifier.

As shown in FIG. 16, the antenna switch 959 is used to selectively connect the first power amplifier 953 and the second power amplifier 954 to desired antenna(s) chosen from the antennas 981a, 981b, . . . 981n. The front end system 970 is coupled to the antennas 981a, 981b, . . . 981n at antenna terminals 995a, 995b, . . . 995n, respectively. Although the RF communication system 1000 is depicted as included three antennas, more or fewer antennas can be included as indicated by the ellipses.

In the illustrated embodiment, the RF communication system 1000 includes a first transmit path through the first power amplifier 953 and a second transmit path through the second power amplifier 954. The first transmit path is for the first RF transmit signal carrying the first sequence of symbols (SEQ1) and the second transmit path is for the second RF transmit signal carrying the second sequence of symbols (SEQ2).

The baseband system 940 controls generation of the first RF transmit signal and the second RF transmit signal such that the first sequence of symbols and the second sequence of symbols are staggered with one or more sounding reference signal symbols in the second sequence of symbols.

As shown in FIG. 16, the baseband system 940 is further configured to receive a base station capability inquiry from a base station, and to control transmission of capability information to the base station in response to the base station capability inquiry. In certain implementations, the baseband system 940 can further receive transmit configuration information from the base station. The baseband system 940 can configure the transceiver 950 and/or the front end system 970 based on the inquiry and/or transmit configuration information.

Applications

Some of the embodiments described above have provided examples in connection with mobile devices. However, the principles and advantages of the embodiments can be used for a wide range of RF communication systems. Examples of such RF communication systems include, but are not limited to, mobile phones, tablets, base stations, network access points, customer-premises equipment (CPE), laptops, and wearable electronics.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "may," "could," "might," "can," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A mobile device comprising:
   a first transmit chain including a first power amplifier;
   a second transmit chain including a second power amplifier;
   a plurality of antennas including a first antenna, a second antenna, a third antenna, and a fourth antenna;
   a first multi-throw switch configured to selectively connect an output of the second power amplifier to the first antenna, the second antenna, the third antenna, or the fourth antenna; and
   a baseband system configured to generate a first sequence of symbols for transmission by way of the first transmit chain and the first antenna, and a second sequence of symbols for transmission by way of the second transmit chain and the first multi-throw switch, the baseband system further configured to stagger the first sequence of symbols and the second sequence of symbols, and to include a plurality of sounding reference signal symbols in the second sequence of symbols, the plurality of sounding reference signal symbols including a first sounding reference signal symbol transmitted on the second antenna, a second sounding reference signal symbol transmitted on the third antenna, a third sounding reference signal symbol transmitted on the fourth antenna, and a fourth sounding reference signal symbol transmitted on the first antenna.

2. The mobile device of claim 1 wherein the baseband system is further configured to stager symbol transmissions of the first sequence of symbols relative to the second sequence of symbols with substantially no delay between symbol transmissions.

3. The mobile device of claim 1 wherein the first transmit chain is a first uplink multi-input multiple-output chain, and the second transmit chain is a second uplink multiple-input multiple-output chain, and the baseband system is further configured to provide the second sequence of symbols for transmission when an uplink multiple-input multiple-output mode is disabled.

4. The mobile device of claim 1 further comprising a second multi-throw switch configured to selectively connect an output of the first power amplifier to the first antenna or the third antenna.

5. The mobile device of claim 1 wherein the baseband system is further configured to include no blank symbols in either of the first sequence of symbols or the second sequence of symbols.

6. The mobile device of claim 1 wherein the baseband system is further configured to alternate symbol transmissions of the first sequence of symbols and the second sequence of symbols.

7. The mobile device of claim 1 wherein the baseband system is further configured to receive a base station capability inquiry, and to control transmission of capability information in response to the base station capability inquiry.

8. The mobile device of claim 7 wherein the baseband system is further configured to receive transmit configuration information, and to configure the first transmit chain and the second transmit chain to operate with a switching time indicated by the transmit configuration information.

9. The mobile device of claim 8 wherein the transmit configuration information indicates a switching time of 0 microsecond.

10. The mobile device of claim 7 wherein the capability information indicates switching capability for each of a plurality of subcarrier spacings.

11. A method of sounding reference signal switching in a mobile device, the method comprising:
transmitting a first sequence of symbols using a first transmit path through a first power amplifier and a first antenna;
transmitting a second sequence of symbols using a second transmit path through a second power amplifier and a first multi-throw switch that selectively connects an output of the second power amplifier to the first antenna, a second antenna, a third antenna, or a fourth antenna;
staggering symbol transmissions of the second sequence of symbols with respect to the first sequence of symbols; and
transmitting a plurality of sounding reference signal symbols in the second sequence of symbols, the plurality of sounding reference signal symbols including a first sounding reference signal symbol transmitted on the second antenna, a second sounding reference signal symbol transmitted on the third antenna, a third sounding reference signal symbol transmitted on the fourth antenna, and a fourth sounding reference signal symbol transmitted on the first antenna.

12. The method of claim 11 further comprising staggering symbol transmissions of the second sequence of symbols with respect to the first sequence of symbols with substantially no delay between symbol transmissions.

13. The method of claim 11 wherein the first transmit path is a first uplink multi-input multiple-output path, and the second transmit path is a second uplink multiple-input multiple-output path, the method further comprising transmitting the second sequence of symbols when an uplink multiple-input multiple-output mode is disabled.

14. The method of claim 11 further comprising transmitting the first sequence of the symbols through a second multi-throw switch that that selectively connects an output of the second power amplifier to the first antenna or the third antenna.

15. The method of claim 11 further comprising transmitting one or more sounding reference signal symbols in the first sequence of symbols.

16. The method of claim 11 further comprising transmitting no sounding reference signal symbols in the first sequence of symbols.

17. The method of claim 11 further comprising transmitting no blank symbols in either of the first sequence of symbols or the second sequence of symbols.

18. The method of claim 11 further comprising alternating symbol transmissions of the first sequence of symbols and the second sequence of symbols.

19. A front end system comprising:
a plurality of terminals including a first transmit terminal, a second transmit terminal, a first antenna terminal, a second antenna terminal, a third antenna terminal, and a fourth antenna terminal;
a first power amplifier configured to amplify a first radio frequency transmit signal received from the first transmit terminal and to provide a first amplified radio frequency transmit signal to the first antenna terminal, the first radio frequency transmit signal carrying a first sequence of symbols;
a first multi-throw switch configured to selectively connect an input to the first antenna terminal, the second antenna terminal, the third antenna terminal, or the fourth antenna terminal; and
a second power amplifier configured to amplify a second radio frequency transmit signal received from the second transmit terminal and to provide a second amplified radio frequency transmit signal to the input of the first multi-throw switch, the second radio frequency signal carrying a second sequence of symbols that is staggered with respect to the first sequence of symbols and that includes a plurality of sounding reference signal symbols including a first sounding reference signal symbol transmitted on the second antenna terminal, a second sounding reference signal symbol transmitted on the third antenna terminal, a third sounding reference signal symbol transmitted on the fourth antenna terminal, and a fourth sounding reference signal symbol transmitted on the first antenna terminal.

20. The front end system claim 19 further comprising a second multi-throw switch configured to selectively connect an output of the first power amplifier to the first antenna terminal or the third antenna terminal.

* * * * *